(12) United States Patent
Miyahara

(10) Patent No.: US 9,731,928 B2
(45) Date of Patent: Aug. 15, 2017

(54) IMAGE PROCESSING APPARATUS, INFORMATION PROCESSING APPARATUS, AND CONTROL METHOD

(71) Applicant: CANON KABUSHIKI KAISHA, Tokyo (JP)

(72) Inventor: Nobuaki Miyahara, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 14/841,073

(22) Filed: Aug. 31, 2015

(65) Prior Publication Data

US 2016/0060069 A1 Mar. 3, 2016

(30) Foreign Application Priority Data

Sep. 2, 2014 (JP) ................................. 2014-178562

(51) Int. Cl.
| | |
|---|---|
| B65H 37/04 | (2006.01) |
| H04N 1/00 | (2006.01) |
| G06K 15/00 | (2006.01) |
| B65H 39/10 | (2006.01) |
| H04N 1/32 | (2006.01) |
| G03G 15/00 | (2006.01) |

(52) U.S. Cl.
CPC ......... *B65H 37/04* (2013.01); *G03G 15/6541* (2013.01); *H04N 1/0032* (2013.01); *H04N 1/32144* (2013.01); *B65H 2301/1635* (2013.01); *B65H 2301/43828* (2013.01); *B65H 2301/5111* (2013.01); *B65H 2408/1222* (2013.01); *B65H 2511/512* (2013.01); *B65H 2801/27* (2013.01); *G03G 15/6544* (2013.01); *G03G 2215/00848* (2013.01); *G06K 15/404* (2013.01); *H04N 2201/0094* (2013.01); *H04N 2201/3253* (2013.01)

(58) Field of Classification Search
CPC ............ B65H 37/04; B65H 2301/1635; B65H 2301/43828; B65H 2301/5111; B65H 2408/1222; B65H 2511/512; B65H 2801/27; G03G 15/6541; G03G 15/6544; G03G 2215/00848; H04N 1/0032; H04N 1/32144; H04N 2201/0094; H04N 2201/3253; G06K 15/404
USPC .............. 358/3.28; 399/408; 270/1.01, 58.08
See application file for complete search history.

(56) References Cited

U.S. PATENT DOCUMENTS

| | | | | |
|---|---|---|---|---|
| 2011/0222945 | A1* | 9/2011 | Sato | ......................... B42C 1/12 399/408 |
| 2013/0214471 | A1* | 8/2013 | Yabe | ..................... B65H 39/00 270/1.01 |
| 2013/0215470 | A1* | 8/2013 | Ikuno | ................. G06K 15/1867 358/1.18 |

FOREIGN PATENT DOCUMENTS

JP 08-300847 A 11/1996

* cited by examiner

*Primary Examiner* — Quang N Vo
(74) *Attorney, Agent, or Firm* — Canon U.S.A., Inc. IP Division

(57) ABSTRACT

An image processing apparatus performs a binding process for binding a plurality of sheets. When a binding unit configured to bind sheets without using a staple performs the binding process, the image processing apparatus adds a mark for identifying a position where the binding process is performed.

13 Claims, 25 Drawing Sheets

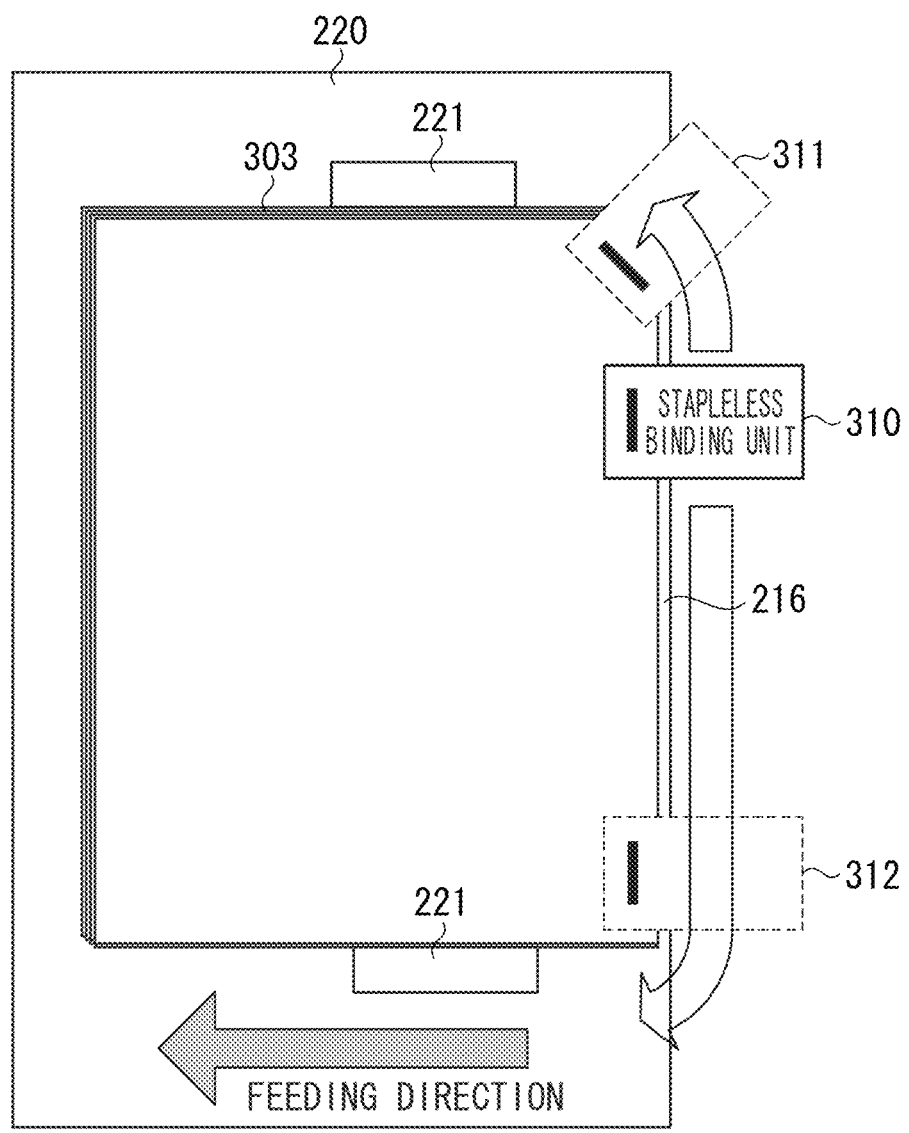

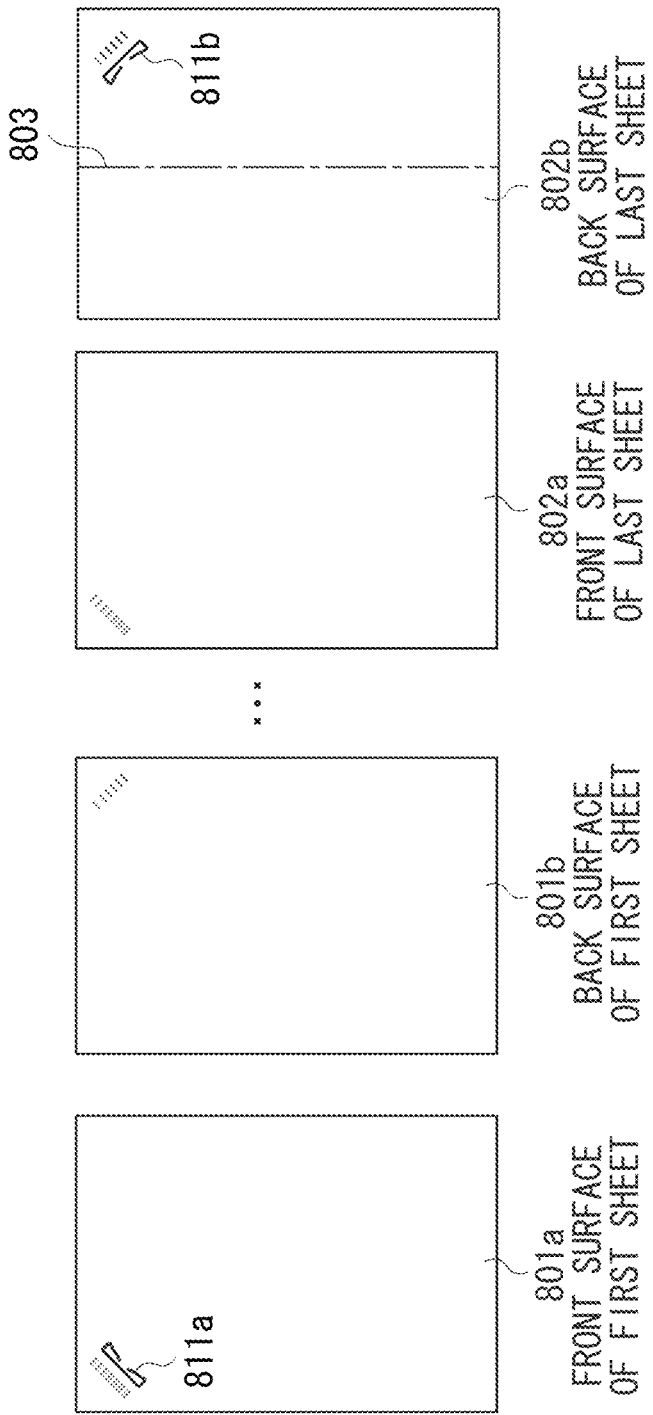

FIG. 8B
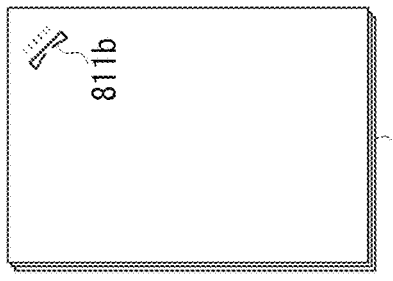
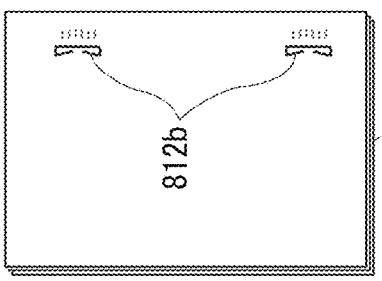
SHEET BUNDLE VIEWED FROM BACK SURFACE OF LAST SHEET
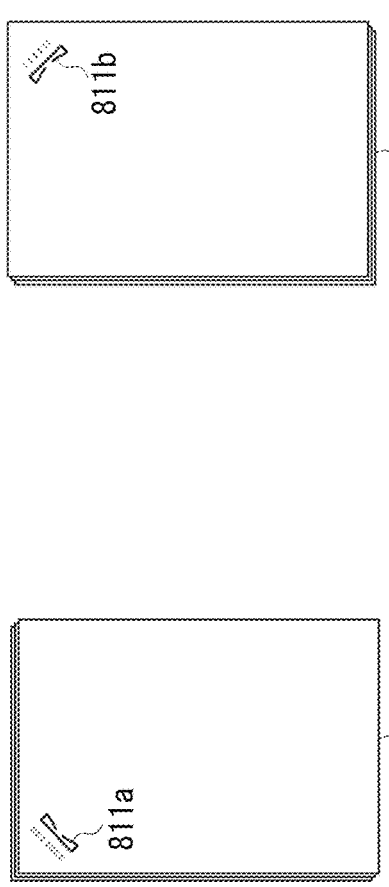
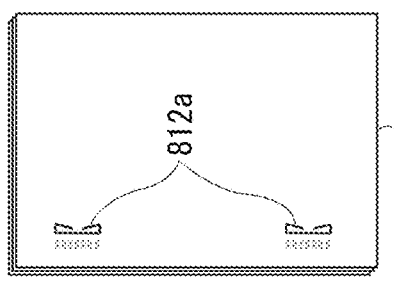
SHEET BUNDLE VIEWED FROM FRONT SURFACE OF FIRST SHEET

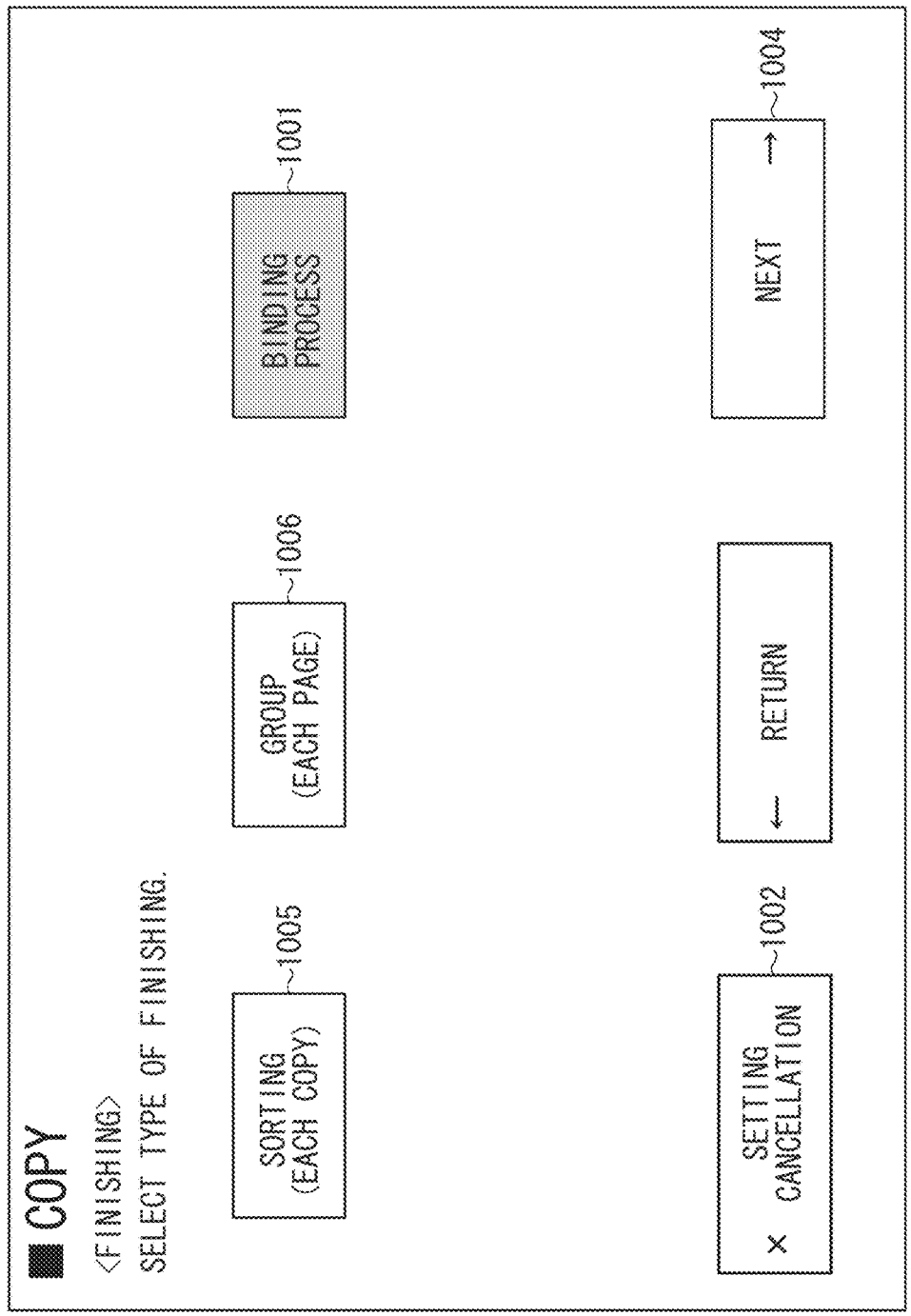

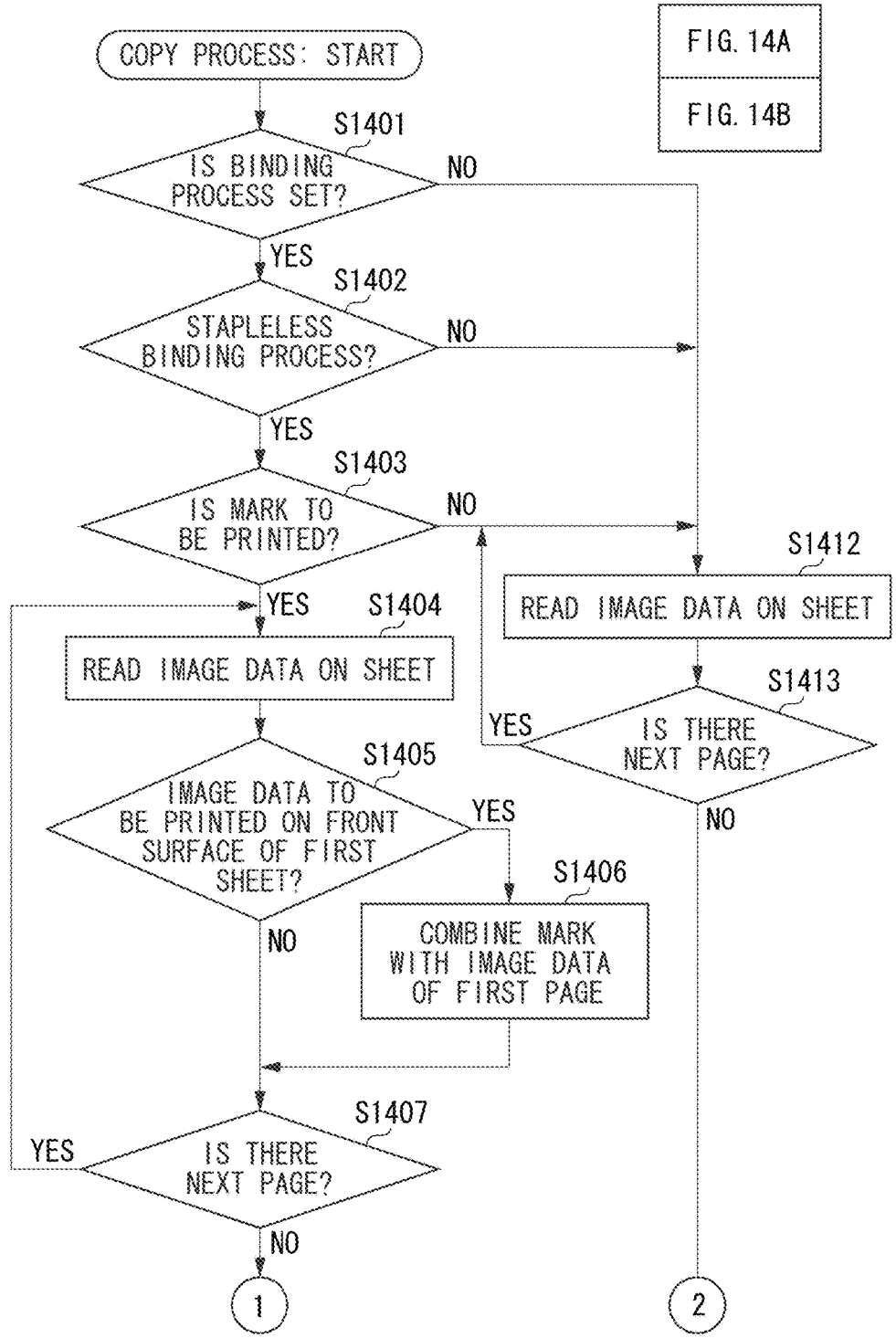

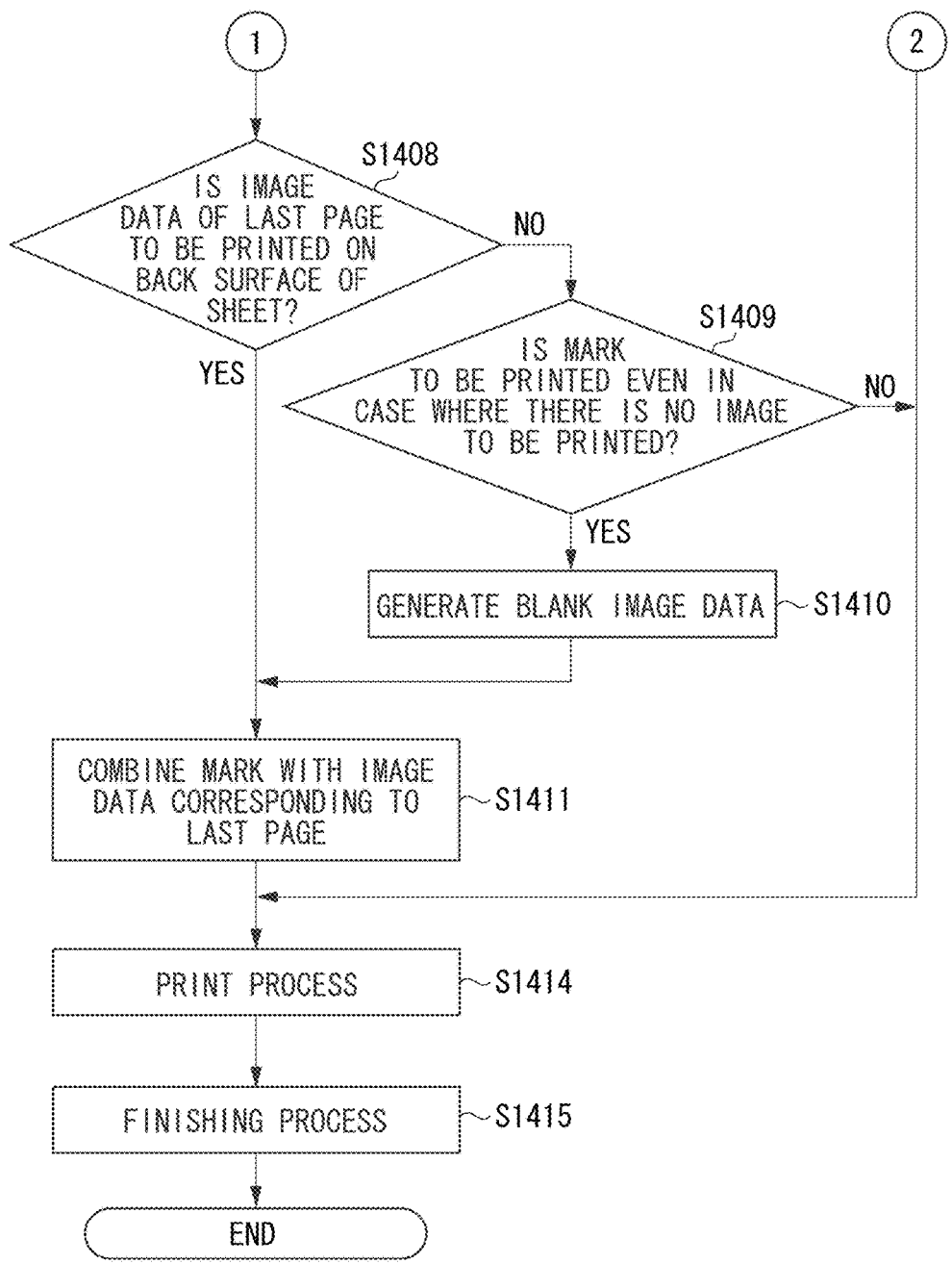

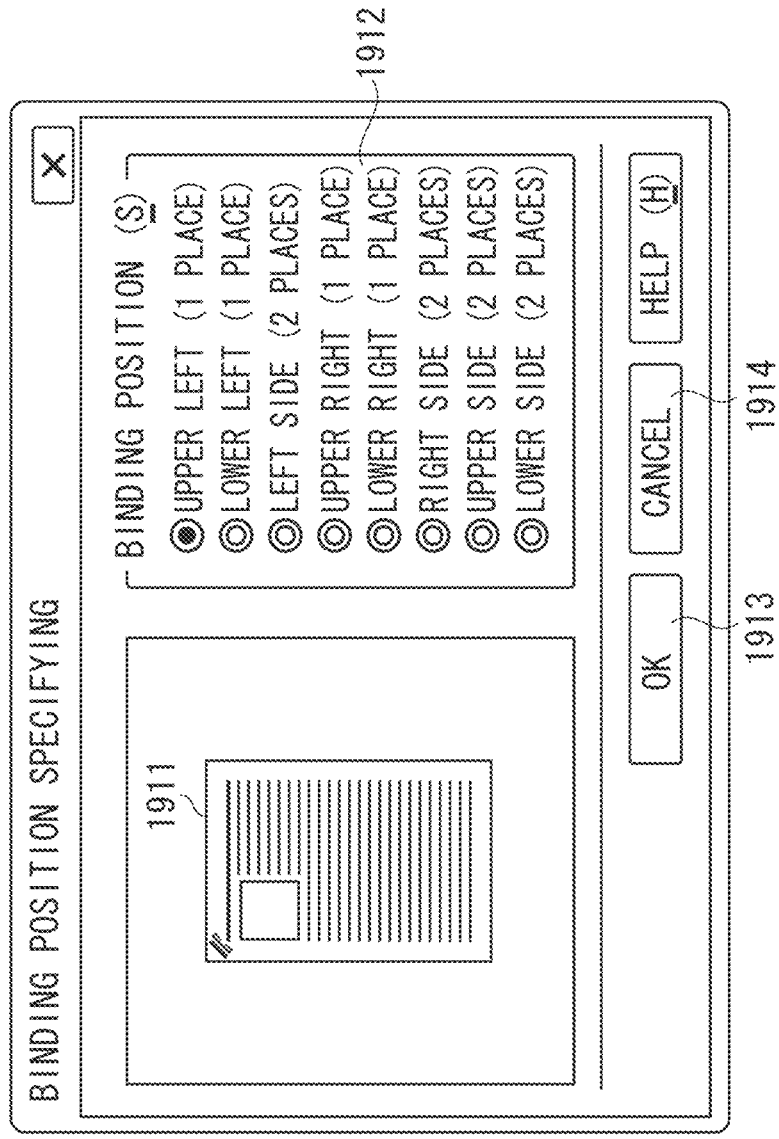

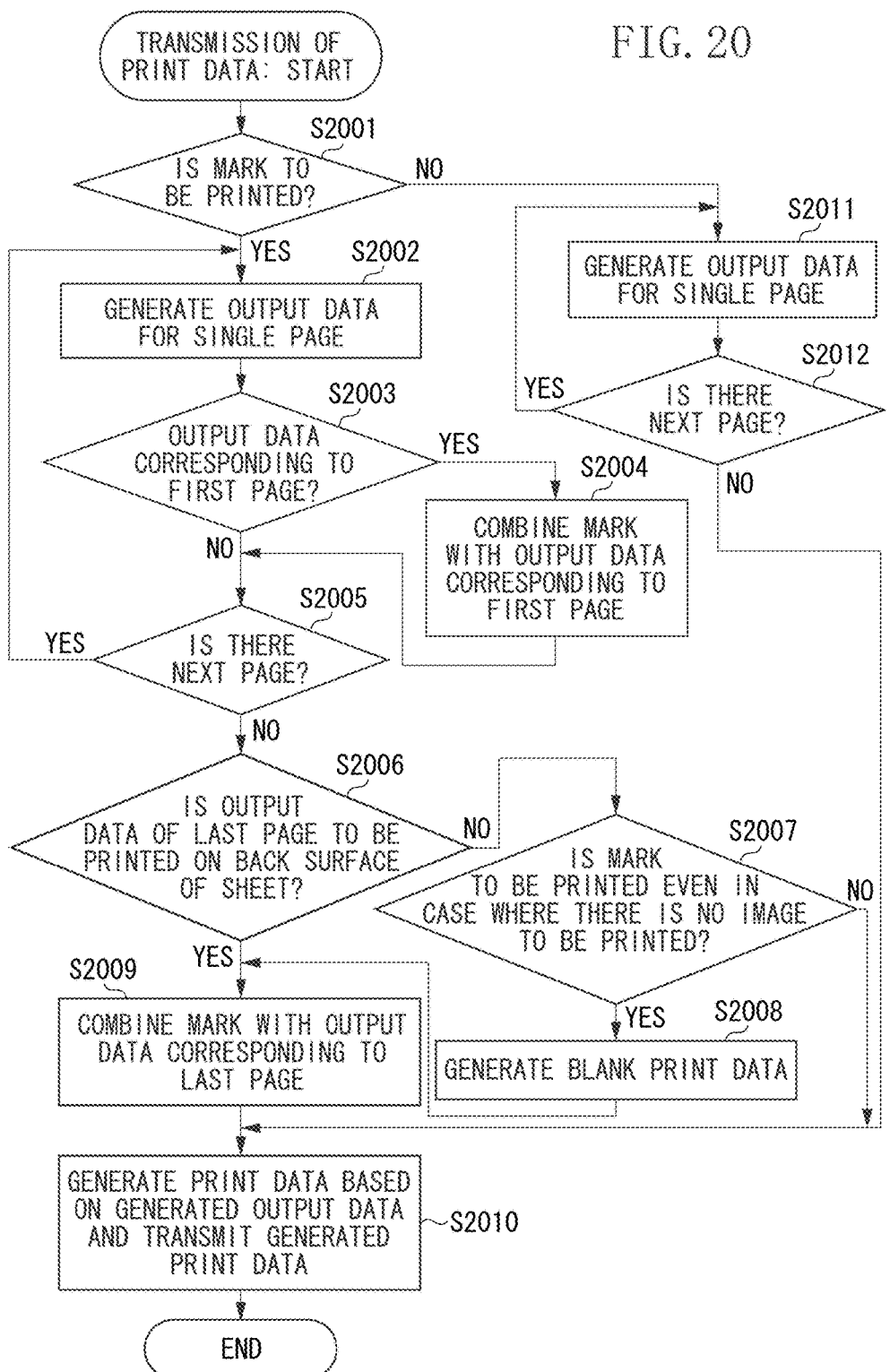

IMAGE PROCESSING APPARATUS, INFORMATION PROCESSING APPARATUS, AND CONTROL METHOD

BACKGROUND OF THE INVENTION

Field of the Invention

The present invention relates to an image processing apparatus for performing a binding process on a plurality of sheets on which images are printed.

Description of the Related Art

There is an image processing apparatus for performing a binding process on a plurality of sheets on which images are printed. As a typical binding process, there is a staple binding process. In the staple binding process, a plurality of sheets is bound using a metal staple.

Further, as a method for binding a plurality of sheets without using a staple, there is a method for cutting a plurality of sheets together in a hollowed-out manner and tucking in the cut ends of the plurality of sheets, thereby binding the plurality of sheets (Japanese Patent Application Laid-Open No. 08-300847). There are also a method for sticking a plurality of sheets with glue, and a method for pressing a special edge against a plurality of sheets to caulk the plurality of sheets.

In a document bound using a staple, a metal staple made of a material different from that of the sheets is present at the position where the binding process is performed. Thus, it is easy to visually identify the position where the binding process is performed. On the other hand, in a document bound without using a staple, although the sheets are somewhat deformed, it is more difficult to identify the position where the binding process is performed than the case where a document is bound using a staple. Thus, if the document is turned over (opened) in the direction in which the document should not be turned over, strong force may be exerted on the binding position. As a result, the sheets may be torn or come off.

SUMMARY OF THE INVENTION

The present invention is directed to a mechanism for, if a binding process without using a staple is performed, allowing easy identification of the position where the binding process is performed.

According to an aspect of the present invention, an image processing apparatus includes a printing unit configured to print an image on a sheet, a stapleless binding unit configured to perform a stapleless binding process for binding, without using a staple, a plurality of sheets on which images are printed by the printing unit, a combining unit configured to combine, with a print target image, a mark image indicating a position where the stapleless binding process is performed, and a control unit configured to, in a case where the stapleless binding unit performs the stapleless binding process, perform control so that an image with which the mark image is combined by the combining unit is printed on a sheet.

Further features of the present invention will become apparent from the following description of exemplary embodiments with reference to the attached drawings.

BRIEF DESCRIPTION OF THE DRAWINGS

FIG. 3 is a diagram illustrating a position where sheets are bound.

FIGS. 8A and 8B are diagrams illustrating cases where the mark is added to only a front surface of a first sheet and a back surface of a last sheet.

FIGS. 10A and 10B are diagrams illustrating operation screens for setting a finishing process.

FIG. 14, which is composed of FIGS. 14A and 14B, is a flowchart illustrating a control method for controlling execution of copying.

FIGS. 19A and 19B are diagrams illustrating operation screens displayed on the display.

FIG. 20 is a flowchart illustrating a control method for transmitting print data to the image processing apparatus.

DESCRIPTION OF THE EMBODIMENTS

Exemplary embodiments of the present invention will be described in detail below with reference to the drawings. It is to be understood that the following exemplary embodiments are not intended to limit the scope of the invention set forth in the appended claims and that all combinations of features described in the exemplary embodiments are not necessarily essential to the technical solution provided by the present invention.

Figure 1:
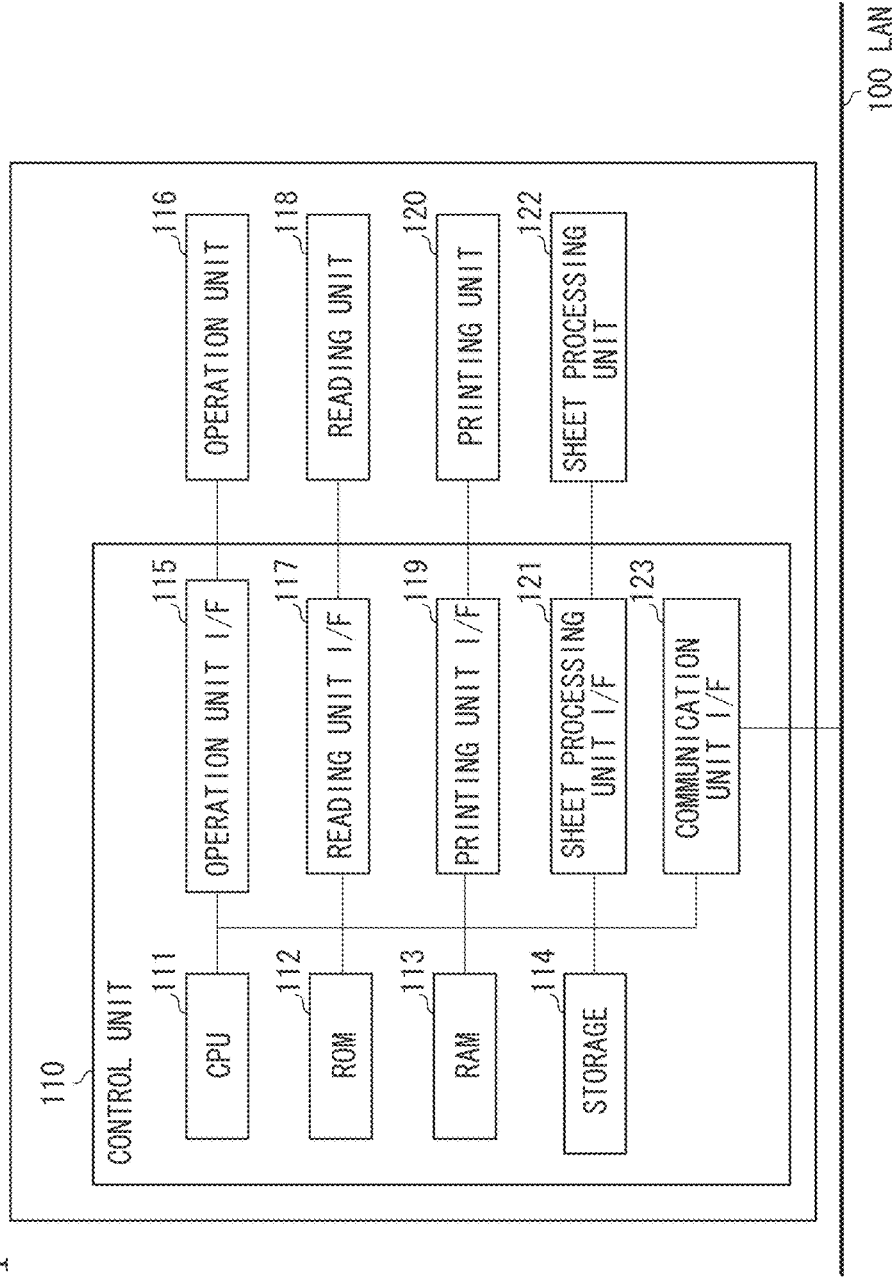
FIG. 1 is a block diagram illustrating a hardware configuration of an image processing apparatus.

First, a first exemplary embodiment of the present invention will be described. FIG. 1 is a block diagram illustrating the hardware configuration of an image processing apparatus according to the present exemplary embodiment. The image processing apparatus has a reading function for reading an image on a sheet, and a printing function for printing an image on a sheet. The image processing apparatus also has post-processing functions such as the one for binding a plurality of sheets on which images are printed, the one for aligning a plurality of sheets, and the one for distributing the discharge destination of a plurality of sheets into a plurality of trays. Examples of a sheet include types of paper such as plain paper and thick paper, and an overhead projector (OHP) sheet.

A control unit 110 includes a central processing unit (CPU) 111, and controls the operation of the entire image processing apparatus. The CPU 111 reads control programs stored in a read-only memory (ROM) 112 or a storage 114 to perform various types of control such as reading control and printing control. The ROM 112 stores a control program that can be executed by the CPU 111. A random-access memory (RAM) 113 is a main storage memory for the CPU 111 and is used as a work area or a temporary storage area for loading a control program stored in the storage 114. The storage 114 stores image data, various programs, various types of history information, and various types of setting information. In the present exemplary embodiment, the storage 114 is assumed to be an auxiliary storage device such as a hard disk drive (HDD). Alternatively, a flash disk typified by a solid-state drive (SSD) may be used instead of the HDD.

In the image processing apparatus according to the present exemplary embodiment, it is assumed that a single CPU 111 uses a single memory (the RAM 113) to perform processes illustrated in flowcharts described below. Alternatively, another form may be employed. For example, a plurality of CPUs, RAMs, ROMs, and storages can cooperate to perform the processes illustrated in the flowcharts described below. Further, some of the processes may be performed using a hardware circuit such as an application-specific integrated circuit (ASIC) or a field programmable gate array (FPGA).

An operation unit interface (I/F) 115 connects an operation unit 116 and the control unit 110. The operation unit 116 displays information to a user and inputs an instruction from the user. To this end, the operation unit 116 includes a touch panel display for displaying operation screens to be described below, and various hardware keys such as a start button and a setting button. The user presses a key displayed on the touch panel display. Alternatively, the operation unit 116 may include a display and various hardware keys instead of the touch panel display. In this case, the user inputs an instruction using the hardware keys. Yet alternatively, the operation unit 116 may include only a touch panel display.

A reading unit I/F 117 connects a reading unit 118 and the control unit 110. The reading unit 118 reads an image on a sheet and converts the read image into image data such as binary data. The image data generated by the reading unit 118 is stored into the storage 114 or the RAM 113 of the control unit 110 via the reading unit I/F 117. Then, the image data is transmitted to an external apparatus via a communication unit I/F 123 or printed on a sheet.

A printing unit I/F 119 connects a printing unit 120 and the control unit 110. Image data to be printed (print target image data) is transferred from the control unit 110 to the printing unit 120 via the printing unit I/F 119. The printing unit 120 prints, on a sheet, an image based on the image data.

A sheet processing unit I/F 121 connects a sheet processing unit 122 and the control unit 110. The sheet processing unit 122 receives a control command from the CPU 111 and performs post-processing on a sheet according to the received control command. For example, the sheet processing unit 122 aligns a plurality of sheets, distributes the discharge destination of a plurality of sheets into a plurality of trays, and binds a plurality of sheets. In the present exemplary embodiment, the sheet processing unit 122 can perform a staple binding process for binding a plurality of sheets with a staple, and a stapleless binding process for binding a plurality of sheets without using a staple.

Further, the control unit 110 is connected to a local area network (LAN) 100 via the communication unit I/F 123. The communication unit I/F 123 transmits image data and information to an external apparatus (an email server, a file server, or a personal computer (PC)) on the LAN 100, and receives image data and information from an external apparatus on the LAN 100. Further, the communication unit I/F 123 communicates with an external apparatus via a network such as a wireless LAN (not illustrated) and communicates with an external apparatus via a local interface such as a Universal Serial Bus (USB) interface. The image data received by the communication unit I/F 123 is stored into the storage 114.

Figure 2:
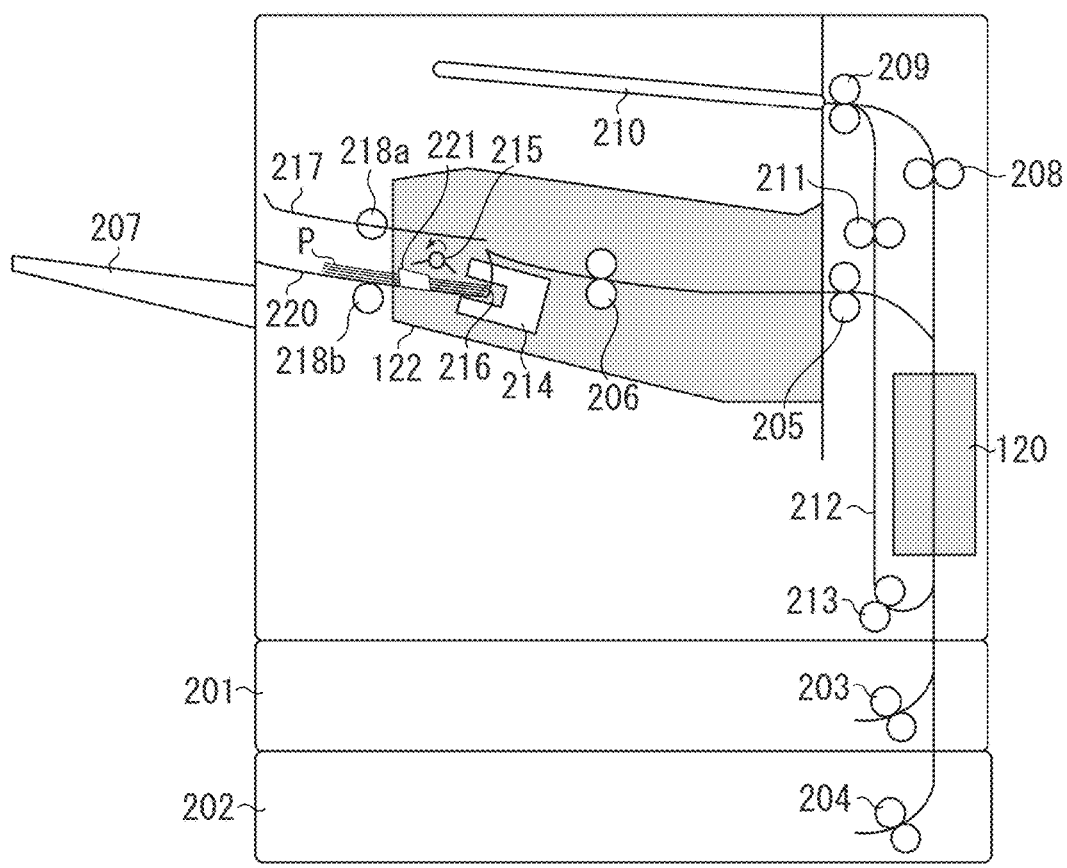
FIG. 2 is a cross-sectional view of the image processing apparatus.

FIG. 2 is a cross-sectional view of the image processing apparatus. In FIG. 2, the control unit 110, the operation unit 116, and the reading unit 118 are omitted. In FIG. 2, the sheet processing unit 122 is placed inside the housing of the image processing apparatus. The placement of the sheet processing unit 122, however, is not limited to the example of FIG. 2. The sheet processing unit 122 may be connected adjacent to the image processing apparatus.

Sheet feeding units 201 and 202 each store a sheet. Although the image processing apparatus includes two sheet feeding units in FIG. 2, the number of sheet feeding units is not limited to two. Conveyance rollers 203 convey the sheet stored in the sheet feeding unit 201 to the printing unit 120. Further, conveyance rollers 204 convey the sheet stored in the sheet feeding unit 202 to the printing unit 120. The printing unit 120 prints an image on the first surface of the conveyed sheet. The printing unit 120 may employ an ink-jet method of spraying ink onto a sheet to print an image, or an electrophotographic method of fixing toner onto a sheet to print an image.

In the case of one-sided printing, the sheet subjected to printing is guided to conveyance rollers 205 and 206, and the conveyance rollers 205 and 206 convey the sheet to the sheet processing unit 122. The sheet guided by the conveyance rollers 206 is discharged to an intermediate tray 220.

The intermediate tray 220 is provided with a slope by locating the downstream side (the upper left side in FIG. 2), in the sheet discharge direction, of the intermediate tray 220 in an upper portion in the vertical direction and locating the upstream side (the lower right side in FIG. 2), in the sheet discharge direction, of the intermediate tray 220 in a lower portion in the vertical direction. This enables the intermediate tray 220 to hold a plurality of sheets. Further, the intermediate tray 220 includes a bundle discharge roller pair 218, which includes a set of an upper bundle discharge roller 218a and a lower bundle discharge roller 218b, which are disposed on the downstream side of the intermediate tray 220. The intermediate tray 220 also includes a drawing paddle 215, which is disposed above an intermediate portion of the intermediate tray 220. The upper bundle discharge roller 218a is supported by a swinging guide 217.

The bundle discharge rollers 218a and 218b receive, onto the intermediate tray 220, a sheet P from the conveyance rollers 206 with the upper bundle discharge roller 218a being separated from the lower bundle discharge roller 218b by swinging control of the swinging guide 217.

Further, aligning members 221 are provided on the near side and the far side of the intermediate tray 220 in the width direction of the intermediate tray 220, which is orthogonal to the sheet conveying direction. The aligning members 221 move in the width direction by a front alignment motor (not illustrated) and a rear alignment motor (not illustrated). The "near side" refers to a portion on the near side of the plane of the paper when the image processing apparatus is viewed in the direction illustrated in FIG. 2, and the "far side" refers to a portion on the far side of the plane of the paper.

The sheet P guided by the conveyance rollers 206 and discharged onto the intermediate tray 220 slides down on a stacking surface of the intermediate tray 220 or on sheets stacked on the intermediate tray 220, by the slope of the intermediate tray 220 and the action of the drawing paddle 215. The sheet P discharged onto the intermediate tray 220 is subjected to an aligning process by the aligning members 221 while sliding down, and stops by the rear end (the upstream end in the discharge direction) of the sheet P hitting a stopper 216.

A sheet bundle aligned on the intermediate tray 220 is subjected to a binding process by a stapleless binding unit 214, where necessary. The stapleless binding unit 214 is configured to be movable along the outer periphery of the intermediate tray 220 in a direction perpendicular to the sheet conveying direction, and can move to a binding position specified by the user. Further, the stapleless binding unit 214 can bind a rear end portion, in the conveying direction, of the sheet bundle held on the intermediate tray 220.

The sheet bundle subjected to post-processing such as a binding process by the sheet processing unit 122 is discharged onto a discharge unit 207. The swinging guide 217 swings so that the bundle discharge roller 218a abuts the top sheet on the intermediate tray 220. The bundle discharge roller pair 218 is driven to rotate in this abutting state, thereby discharging the sheet bundle subjected to the post-processing onto the discharge unit 207.

Next, in the case of two-sided printing, the sheet of which the first surface is subjected to printing by the printing unit 120 is guided to conveyance rollers 208, and the conveyance rollers 208 convey the sheet to conveyance rollers 209. The conveyance rollers 209 convey the sheet to a reversing path 210. If the rear end of the sheet reaches the conveyance rollers 209, the conveyance rollers 209 start rotating backward and convey the sheet to conveyance rollers 211. The conveyance rollers 211 convey the sheet to conveyance rollers 213 via a two-sided printing conveyance path 212. The conveyance rollers 213 convey the sheet to the printing unit 120. The printing unit 120 prints an image on the second surface of the sheet. The sheet subjected to two-sided printing is guided to the conveyance rollers 205 and 206, and the conveyance rollers 205 and 206 convey the sheet to the sheet processing unit 122. Then, the sheet is subjected to post-processing such as a binding process similarly to the case of one-sided printing.

FIG. 3 is a diagram illustrating a binding position of the stapleless binding unit 214. FIG. 3 illustrates a plurality of sheets 303. The sheet processing unit 122 is configured to move the stapleless binding unit 214 to the binding position according to information about a binding process that is received from the CPU 111 to bind the plurality of sheets 303. For example, in FIG. 3, a current position 310 of the stapleless binding unit 214 is indicated by a solid line. The CPU 111 can move the stapleless binding unit 214 to, for example, positions 311 and 312, and cause the stapleless binding unit 214 to bind the plurality of sheets 303 at the positions 311 and 312 without using a staple.

FIGS. 2 and 3 illustrate only the stapleless binding unit 214 (a first binding unit) as an example of a binding unit. Alternatively, a staple binding unit (a second binding unit (not illustrated)) may be further included. Further, the staple binding unit and the stapleless binding unit 214 may be included as a single unit in the sheet processing unit 122. Further, FIG. 3 illustrates an area where the stapleless binding unit 214 can move. Alternatively, the movement area of the stapleless binding unit 214 may be wider than illustrated in FIG. 3. Further, if the stapleless binding unit 214 and the staple binding unit (not illustrated) are included as different units, a retreat area for preventing the physical interference between these units may be provided.

Figure 4A:
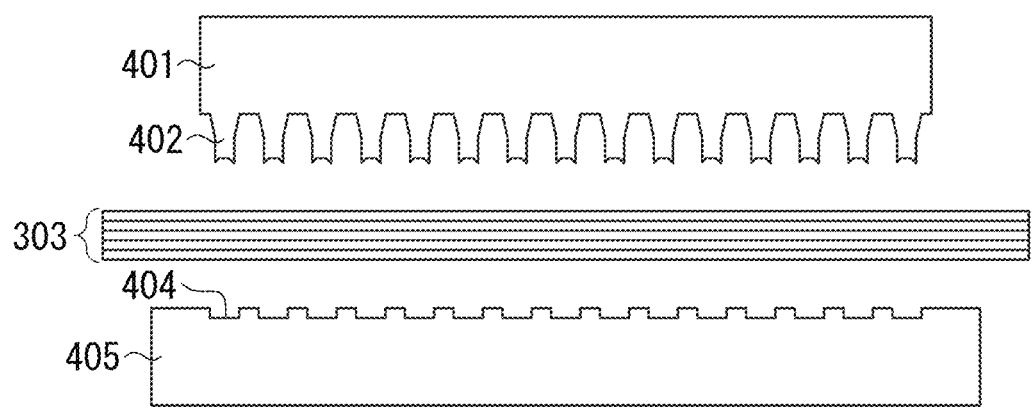
FIGS. 4A and 4B are diagrams illustrating a stapleless binding process performed by a stapleless binding unit.
Figure 4B:
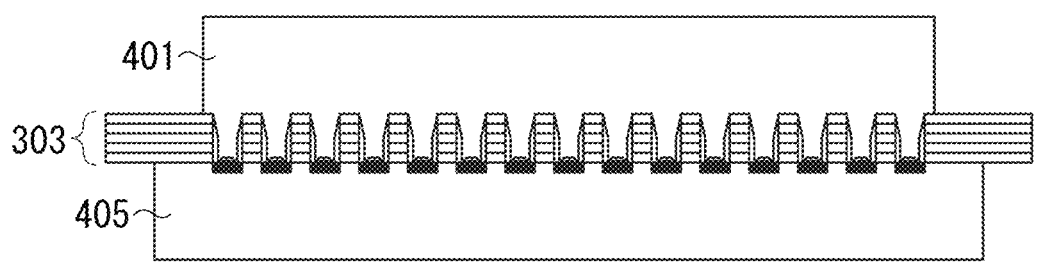

FIGS. 4A and 4B are diagrams illustrating a stapleless binding process performed by the stapleless binding unit 214. In the stapleless binding process, the stapleless binding unit 214 applies pressure to the plurality of sheets 303 from above and below to bind the plurality of sheets 303 in close contact with each other. FIG. 4A illustrates a state where the stapleless binding unit 214 moves to the binding position for binding the plurality of sheets 303. An upper metal mold 401 presses down the plurality of sheets 303 from above. In the upper metal mold 401, a plurality of protruding edges 402 are arranged, and each edge 402 applies pressure to the sheets 303. A lower metal mold 405 presses down the plurality of sheets 303 from below. In the lower metal mold 405, a plurality of recessed portions 404, which correspond to the plurality of respective edges 402, are arranged, and each recessed portion 404 receives the corresponding edge 402.

FIG. 4B illustrates a state where the upper metal mold 401 and the lower metal mold 405 apply pressure to the plurality of sheets 303 from above and below. The upper metal mold 401 and the lower metal mold 405 apply pressure to the plurality of sheets 303, thereby enabling the binding of the plurality of sheets 303. The plurality of edges 402 and the plurality of recessed portions 404 apply pressure to a plurality of points in the sheets 303, thereby preventing the sheets 303 from coming off. In the present exemplary embodiment, the stapleless binding unit 214 is a binding unit for applying pressure to a plurality of sheets to bind the plurality of sheets in close contact with each other. The binding process of the present invention, however, is not limited to this. Alternatively, for example, the binding process may be achieved by sticking a plurality of sheets with glue or adhesive.

Figure 5:
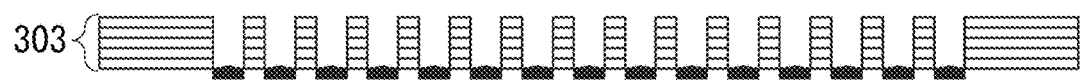
FIG. 5 is a diagram illustrating a cross section of a plurality of bound sheets.
Figure 6:
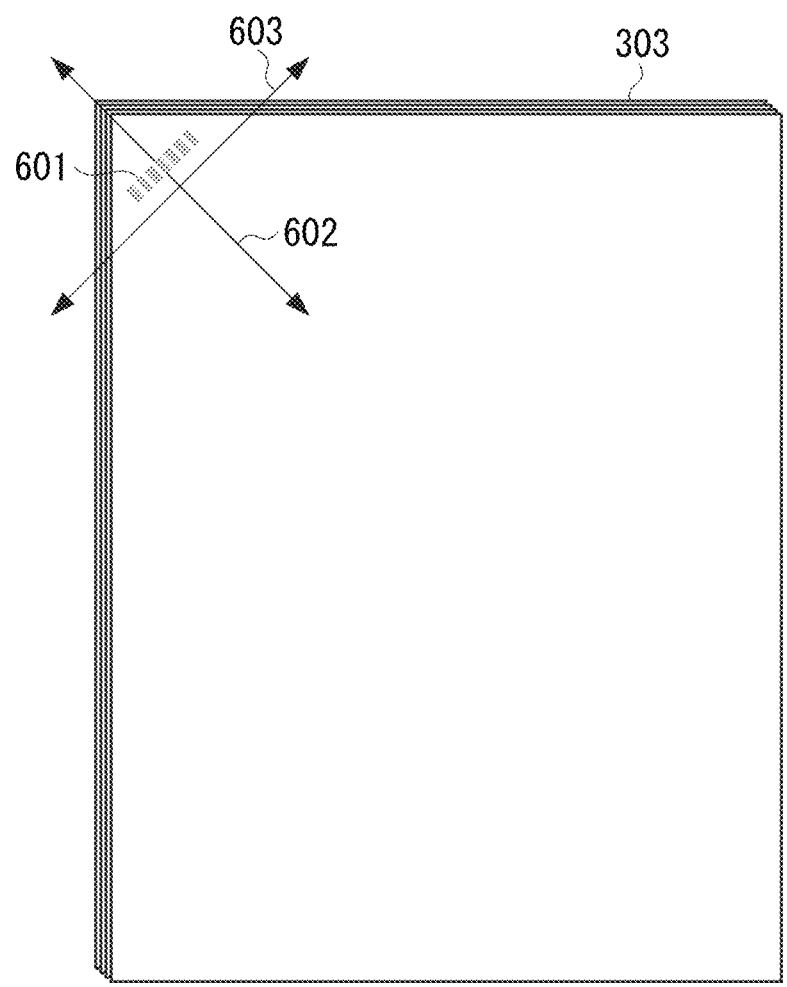
FIG. 6 is a top view of the plurality of bound sheets.

FIG. 5 is a diagram illustrating a cross section of a binding position portion of the sheets 303 subjected to the binding process. The binding position portion is bound by the upper metal mold 401 and the lower metal mold 405 applying pressure to and crushing a plurality of points in the sheets 303. FIG. 6 is a top view of the plurality of bound sheets 303. A binding position 601 indicates a position where the binding process is performed. Arrows 602 and 603 illustrate examples of the directions of external forces applied when the sheets 303 are turned over (opened), and indicate in which directions the sheet bundle is turned over. The direction of the arrow 602 indicates the direction in which the binding strength is great. Even if a force in the direction of the arrow 602 is applied to the binding position 601 when a viewer turns over the sheets 303, the sheets 303 are unlikely to come off. On the other hand, the direction of the arrow 603 indicates the direction in which the binding strength is small. If a force in the direction of the arrow 603 is applied to the binding position 601 when the viewer turns over the sheets 303, the sheets 303 are likely to come off.

In FIG. 6, the deformation of the sheets 303 at the binding position 601 is indicated in gray. However, what can actually be visually recognized is the trace of the deformation by the pressure of the upper metal mold 401 and the lower metal mold 405. When the plurality of sheets 303 thus bound without using a staple are read by the viewer, the trace of the deformation left on the binding position 601 appears differently depending on the angle of the ambient light. Thus, depending on the angle of the ambient light, it may be difficult to visually identify which part of the sheets 303 is bound. If the viewer overlooks the fact that the sheets 303 are bound, the viewer may recognize and treat the sheets 303 as a plurality of unbound sheets. For example, suppose that the viewer reads a plurality of unbound sheets. If the viewer finishes reading the first sheet of the plurality of sheets, then to read the second sheet, the viewer may perform the action of moving the first sheet from the lower left to the upper right in FIG. 6 to place the first sheet to the end of the plurality of sheets. Thus, if the viewer performs such an action on the plurality of bound sheets 303, a strong force is applied in the direction of the arrow 603, in which the binding strength is small. Thus, the sheets 303 may come off.

As described above, it is difficult to recognize that the sheets 303 are bound if bound by the stapleless binding unit 214. Thus, if the sheets 303 are turned over in the direction in which the sheets 303 should not be turned over, the sheets 303 may come off. To address this problem, in the present exemplary embodiment, a mark 701 is printed, which allows easy identification of the position where the binding process is performed.

Figure 7A:
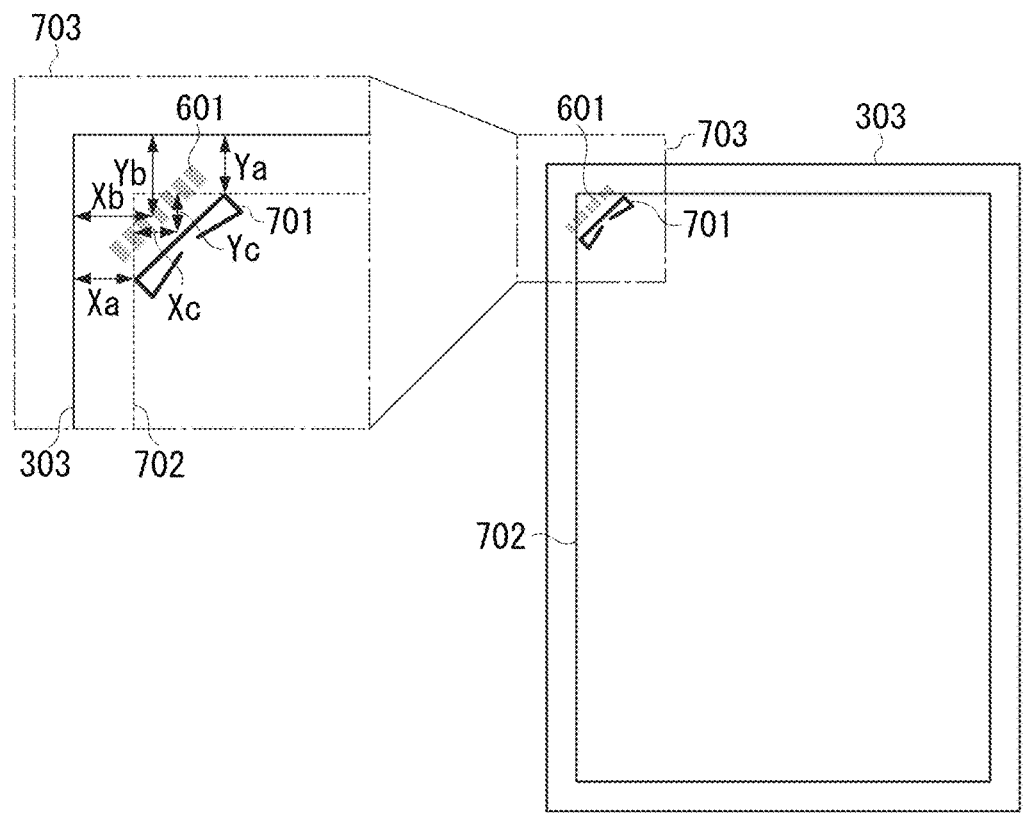
FIGS. 7A and 7B are diagrams illustrating a mark to be added to a sheet.
Figure 7B:
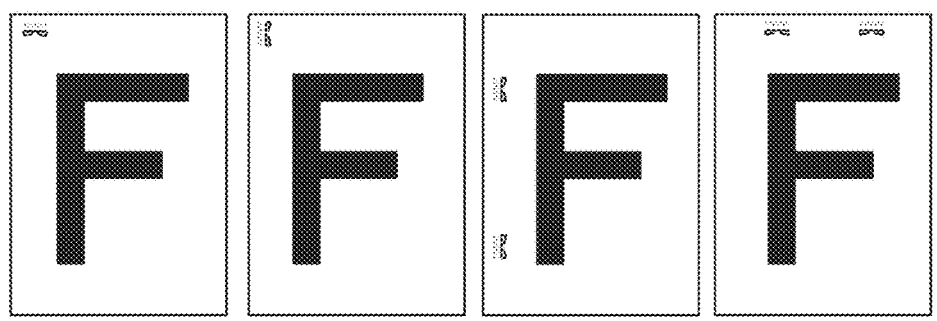

FIGS. 7A and 7B are diagrams illustrating examples of a mark to be added to the sheets. When viewing the sheets 303, the viewer can visually recognize the mark 701 and identify the position of the binding process and the binding direction. In the present exemplary embodiment, the design of the mark 701 suggests a metal staple. The design of the mark 701, however, is not limited to this. The mark 701 only needs to allow the viewer to recognize that the binding process is performed. Further, FIGS. 7A and 7B illustrate cases where the mark 701 is printed in black. Alternatively, the mark 701 may be printed in another color. Yet alternatively, based on an image on the page on which the mark 701 is to be printed, the mark 701 may be printed in a color different from the background color. Further, the addition of the mark 701 may be achieved not only by printing but also by imprinting a stamp. In this case, for example, the stapleless binding unit 214 may include a stamp for imprinting the mark 701 and imprint the mark 701 before or after performing the binding process.

Next, the description will be given of an addition position where the mark 701 is added. FIG. 7A illustrates an area 702 as an example of an area where the printing unit 120 can perform printing. When the printing unit 120 performs printing, there is an area where printing cannot be performed in an outer portion of the sheets 303 due to a factor such as the conveyance of the sheets 303. The area 702 indicates the range where printing can actually be performed on the sheets 303. An area 703 is an area including the binding position 601 of the plurality of sheets 303 and the mark 701. The binding position 601 is pressed by the stapleless binding unit 214 at the position of coordinates (Xb, Yb) with the origin located at the upper left corner of the sheets 303. On the other hand, the mark 701 is printed at a position slightly shifted from the binding position 601. This is to, when the sheets are pressure-bonded together by the stapleless binding process, prevent toner or ink from entering the space between the sheets to reduce the binding strength. This is also to, in a case where the stapleless binding unit 214 employs a method of binding sheets with glue, prevent toner or ink from being mixed with the glue portion to reduce the adhesive strength. Further, when the printing unit 120 adds the mark 701, the printing unit 120 prints the mark 701 such that the entire mark 701 is placed on the inner side of the sheet than coordinates (Xa, Ya) with the origin located at the upper left corner of the sheets 303.

In the present exemplary embodiment, the description is given of an example case where the mark 701 is printed at the coordinates on slightly inner side of the sheet than the binding position 601. The position of the mark 701, however, is not limited to this. If the binding process is performed in the area 702 where printing can be performed, the mark 701 may be printed at a position overlapping the binding position 601. The mark 701 only needs to be printed near the binding position 601 and in the area 702 where printing can be performed by the printing unit 120. If the mark 701 is realized using a stamp, the position of the mark 701 is not limited to the area 702. The mark 701 is only required to be imprinted near the binding position 601.

Further, FIG. 7B illustrates examples of another binding position and another printing position of the mark 701 in the present exemplary embodiment. For example, the binding process may be performed on a plurality of places in the sheets 303. Further, FIG. 7A illustrates an example of the binding process of binding the sheets 303 in an oblique direction. Alternatively, for example, the sheets 303 may be bound parallel to the long side of the sheets 303, or may be bound parallel to the short side of the sheets 303.

FIGS. 8A and 8B are diagrams illustrating examples of cases where the mark is added only to the front surface of the first sheet and the back surface of the last sheet. FIG. 8A illustrates a case where the binding process is performed on the upper left end of the front surface of the first sheet. A sheet 801 is the first sheet of a sheet bundle and has a front surface 801a and a back surface 801b. A sheet 802 is the last sheet of the sheet bundle and has a front surface 802a and a back surface 802b.

The mark to be added to the back surface of the last sheet is printed at a position line-symmetric to the position of the mark to be added to the front surface of the first sheet with respect to a central axis 803 of the sheets as an axis of symmetry. In the present exemplary embodiment, it is assumed that the design of the mark 701 suggests a metal staple. Thus, an image corresponding to the mark is appropriately rotated according to the direction of the binding process and then printed.

FIG. 8B is a diagram illustrating examples of the relationship between the binding position and the printing position of the mark. For example, if the binding process is performed on the upper left end of the sheets as viewed from the front side of the sheet bundle, the mark is printed at a position 811a on the front surface of the first sheet. The mark is also printed at a position 811b on the back surface of the last sheet. For example, if the binding process is performed on two places at the left end of the sheets as viewed from the front side of the sheet bundle, the mark is printed at positions 812a on the front surface of the first sheet. The mark is also printed at positions 812b on the back surface of the last sheet.

Next, the settings of the printing of the mark will be described. The user presses a setting/registration button (not illustrated) of the operation unit 116 and thereby can change settings regarding the function of the image processing apparatus. As an item of settings for controlling a printing operation, the user can make settings regarding the printing of the mark when the stapleless binding process is performed.

Figure 13:
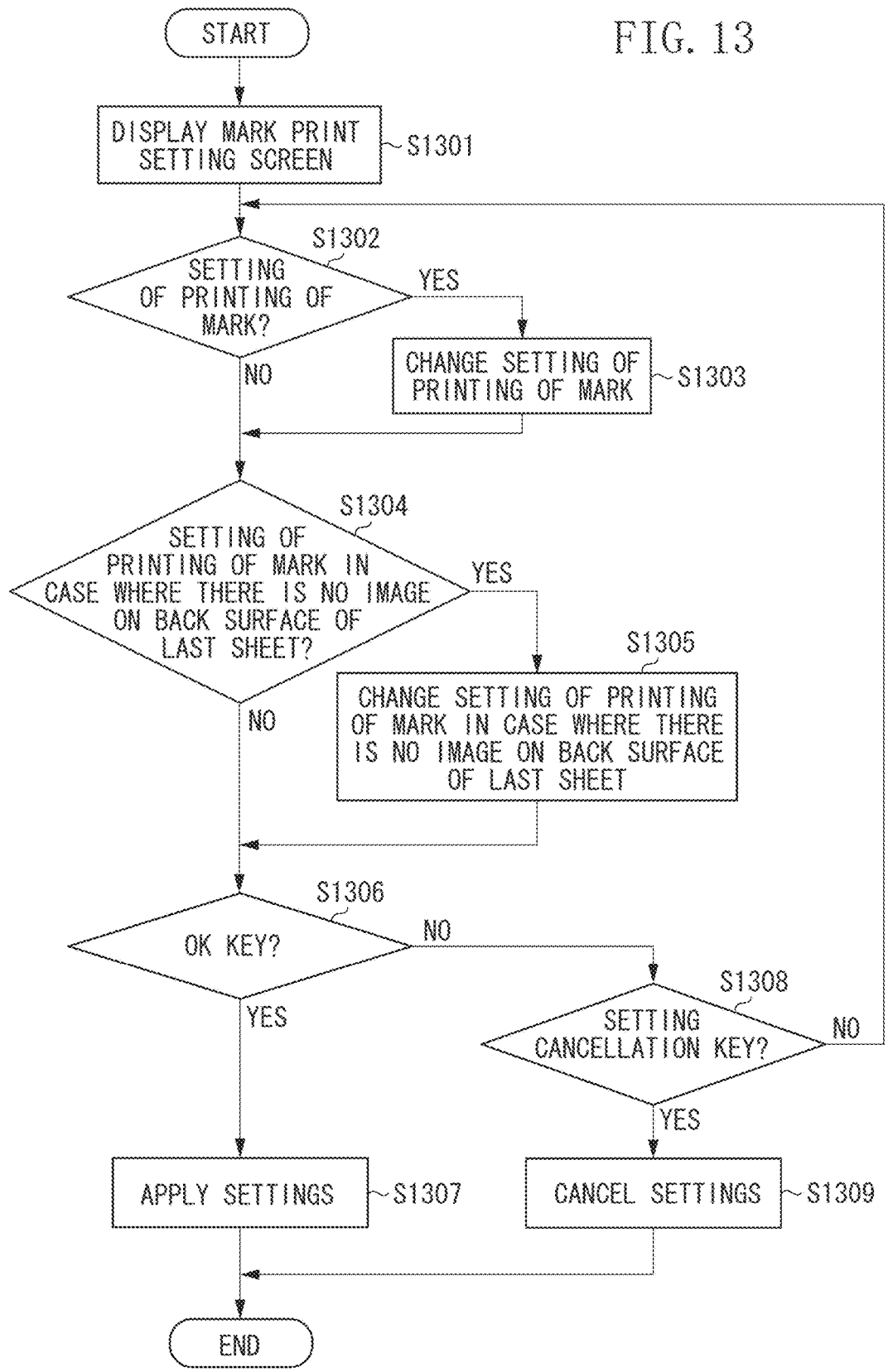
FIG. 13 is a flowchart illustrating a setting method for setting the addition of the mark.

If the user selects, on a setting/registration screen (not illustrated), mark print settings when the stapleless binding process is performed, the CPU 111 performs a control process based on a flowchart in FIG. 13. Each operation (step) illustrated in the flowchart in FIG. 13 is achieved by the CPU 111 loading a control program stored in the ROM 112 or the storage 114 into the RAM 113 and executing the control program.

Figure 11:
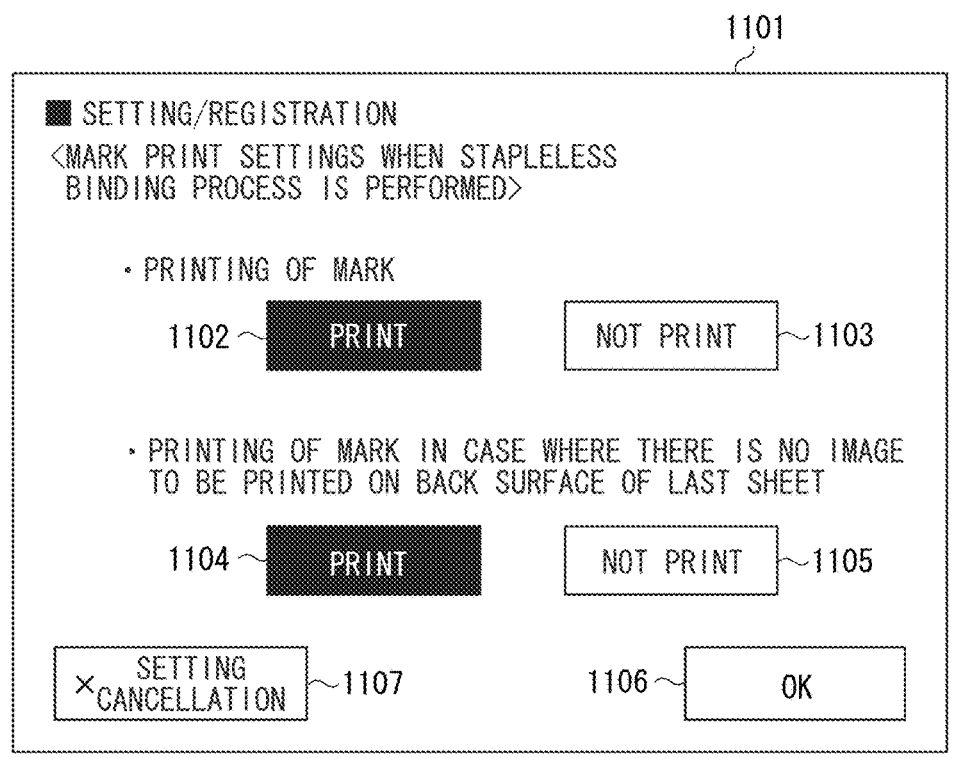
FIG. 11 is a diagram illustrating an operation screen for setting addition of the mark.

First, in step S1301, the CPU 111 controls the operation unit 116 to display an operation screen 1101 for setting the mark to be added to the sheets. FIG. 11 is a diagram illustrating an example of the operation screen displayed in step S1301.

Via the operation screen 1101 in FIG. 11, the user can set whether the mark is to be added in a case where the stapleless binding process is performed. In the present exemplary embodiment, the contents set on the screen 1101 in FIG. 11 are held in the storage 114 or the RAM 113 as common settings in a case where the apparatus performs the stapleless binding process. The setting of whether the mark is to be added may be made with respect to each job via, for example, screens illustrated in FIGS. 10A and 10B as examples.

Keys 1102 and 1103 are keys for setting whether the mark is to be printed in a case where the binding process without using a staple is performed. To make a setting so that the mark is to be printed, the user presses the key 1102. To make a setting so that the mark is not to be printed, the user presses the key 1103. The keys 1102 and 1103 perform a toggle operation, and only one of the keys is set to enabled. Keys 1104 and 1105 also perform a similar toggle operation. FIG. 11 illustrates an example case where the keys 1102 and 1104 are set to enabled.

Further, the keys 1104 and 1105 are keys for setting whether the mark is to be printed in a case where there is no image to be printed on the back surface of the last sheet. These keys are used to set whether only the mark is to be printed in a case where a normal print process is not performed on the back surface of the last sheet, such as a case where the number of pages to be subjected to two-sided printing is an odd number, or a case where printing is performed only on one side.

In the present exemplary embodiment, if there is an image to be printed on the back surface of the last sheet, the mark is added to the back surface of the last sheet. The present invention, however, is not limited to this. For example, even if there is an image to be printed on the back surface of the last sheet, the mark may be added only to the front surface of the first sheet.

Referring back to FIG. 13, in step S1302, the CPU 111 determines whether either the key 1102 or 1103 is pressed. If the CPU 111 determines that either the key 1102 or 1103 is pressed (YES in step S1302), the processing proceeds to step S1303. If, on the other hand, the CPU 111 determines that neither the key 1102 nor the key 1103 is pressed (NO in step S1302), the processing proceeds to step S1304.

In step S1303, the CPU 111 changes the setting of the printing of the mark. If the key 1102 is pressed, the CPU 111 sets the printing of the mark to enabled. If the key 1103 is pressed, the CPU 111 sets the printing of the mark to disabled.

In step S1304, the CPU 111 determines whether either the key 1104 or 1105 is pressed. If the CPU 111 determines that either the key 1104 or 1105 is pressed (YES in step S1304), the processing proceeds to step S1305. If, on the other hand, the CPU 111 determines that neither the key 1104 nor the key 1105 is pressed (NO in step S1304), the processing proceeds to step S1306.

In step S1305, the CPU 111 sets whether the mark is to be printed on the back surface of the last sheet in a case where there is no image to be printed on the back surface of the last sheet. If the key 1104 is pressed, the CPU 111 sets the printing of the mark on the back surface of the last sheet to enabled even in a case where there is no image to be printed on the back surface of the last sheet. If, on the other hand, the key 1105 is pressed, the CPU 111 sets the printing of the mark on the back surface of the last sheet to disabled in a case where there is no image to be printed on the back surface of the last sheet.

In step S1306, the CPU 111 determines whether a key 1106 is pressed. If the CPU 111 determines that the "OK" key 1106 is pressed (YES in step S1306), the processing proceeds to step S1307. If the CPU 111 determines that the "OK" key 1106 is not pressed (NO in step S1306), the processing proceeds to step S1308. In step S1307, the CPU 111 stores, into the storage 114 or the RAM 113, the settings selected by the user as setting values, and ends the control of the settings of the mark.

In step S1308, the CPU 111 determines whether a key 1107 is pressed. If the CPU 111 determines that the "setting cancellation" key 1107 is pressed (YES in step S1308), the processing proceeds to step S1309. If the CPU 111 determines that the "setting cancellation" key 1107 is not pressed (NO in step S1308), the processing returns to step S1302. In step S1309, the CPU 111 discards the settings made via the screen 1101 in FIG. 11, and ends the control of the settings of the mark.

Figure 9:
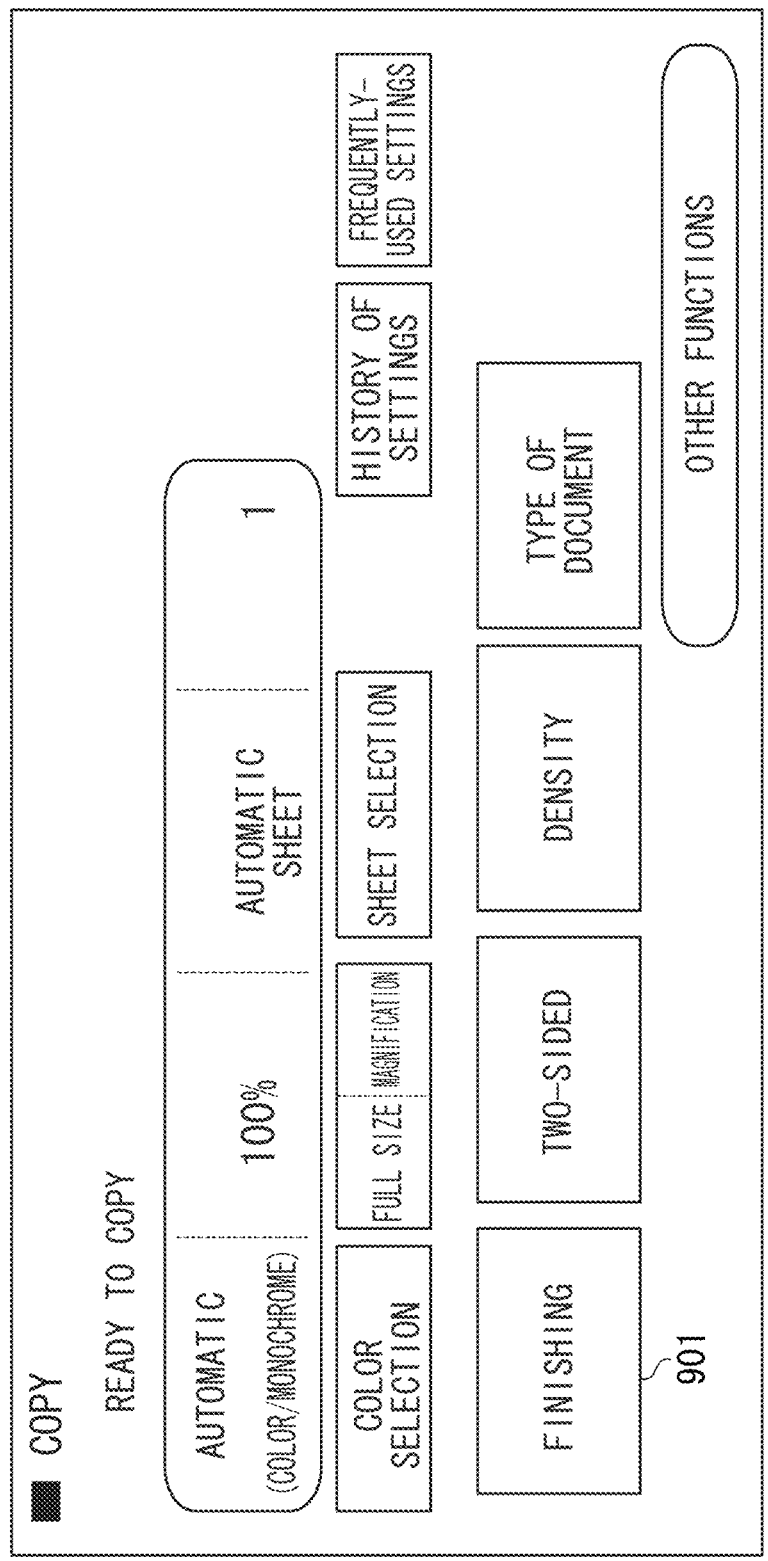
FIG. 9 is a diagram illustrating an operation screen displayed on an operation unit.
Figure 10B:
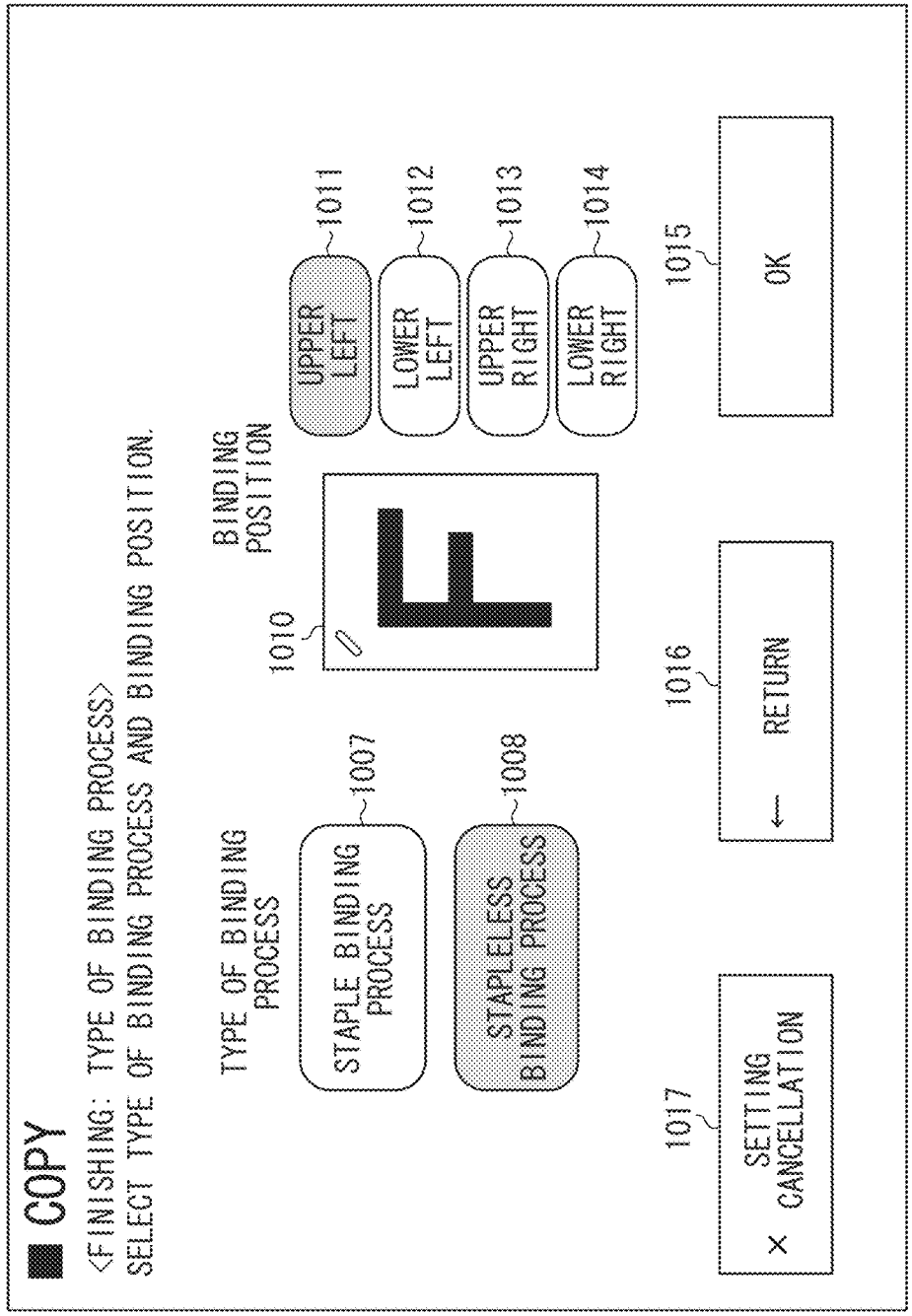
Figure 12:
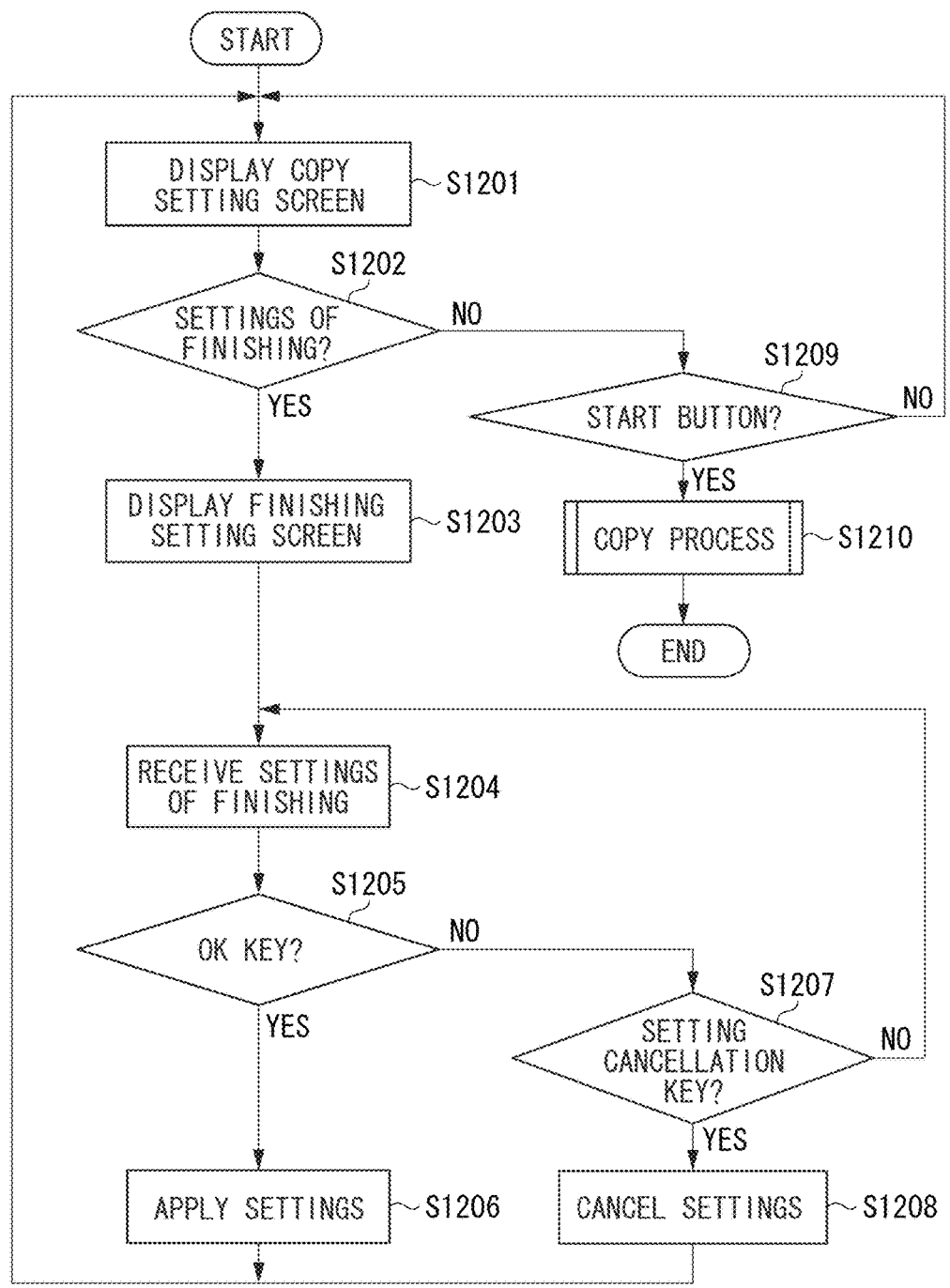
FIG. 12 is a flowchart illustrating a control method for controlling a copy process.

Next, the control of the binding process will be described using a copy function of the image processing apparatus according to the present exemplary embodiment. FIGS. 9, 10A, and 10B are diagrams illustrating examples of operation screens displayed on the operation unit 116. Each operation screen will be described with a control method for controlling copying, which will be described below. FIGS. 12 and 14 are flowcharts illustrating a control method for controlling the execution of copying. Each operation (step) illustrated in the flowcharts in FIGS. 12 and 14 is achieved by the CPU 111 loading a control program stored in the ROM 112 or the storage 114 into the RAM 113 and executing the control program.

If the user selects copying on a main screen (not illustrated) displayed on the operation unit 116, the CPU 111 executes this control program. First, in step S1201, the CPU 111 controls the operation unit 116 to display an operation screen for setting copying. FIG. 9 is a diagram illustrating an example of a copy setting screen displayed in step S1201. Via the screen in FIG. 9, the user can select color copying or monochrome copying, set the magnification for copying, and select the type of two-sided copying. To set finishing for the copy process, the user presses a key 901.

In step S1202, the CPU 111 determines whether the key 901 is pressed on the screen in FIG. 9. If the key 901 is pressed (YES in step S1202), the processing proceeds to step S1203. If the key 901 is not pressed (NO in step S1202), the processing proceeds to step S1209. In step S1203, the CPU 111 controls the operation unit 116 to display an operation screen illustrated in FIG. 10A. FIG. 10A is a diagram illustrating an example of the operation screen displayed on the operation unit 116. Further, FIG. 10B is a diagram illustrating an example of an operation screen to which the screen in FIG. 10A transitions. Via the operation screens in FIGS. 10A and 10B, the user sets finishing when copying is performed.

In step S1204, the CPU 111 receives the settings of finishing via the screens in FIGS. 10A and 10B. A key 1005 is a key used to finish each copy as a set. For example, in the case of printing 10 copies of five pages, five sheets corresponding to a single copy are discharged as a single bundle. A key 1006 is a key used to finish each page as a set. For example, in the case of printing 10 copies of five pages, 10 sheets corresponding to the same page are discharged as a single bundle.

Further, a key 1001 is a key used to perform the binding process. For example, in the case of printing 10 copies of five pages, five sheets corresponding to a single copy are subjected to the binding process as a single bundle and discharged.

Keys 1002 is a key used to discard the settings of finishing made via the screens in FIGS. 10A and 10B. A key 1004 is a key used with one of the keys 1001, 1005, and 1006 being pressed to set each finishing process. If the key 1004 is pressed with the key 1001 being pressed, the screen in FIG. 10A transitions to the screen in FIG. 10B.

FIG. 10B is a diagram illustrating an example of an operation screen for selecting the type and the position of the binding process. Information 1010 is information for notifying the user of the set binding position. A key 1007 is a key for selecting the staple binding process. A key 1008 is a key for selecting the stapleless binding process. Further, keys 1011 to 1014 are keys for selecting the binding position.

Further, a key 1015 is a key used to set, as setting values of a job, the settings of finishing made via the screens in FIGS. 10A and 10B. A key 1016 is a key used to return to the screen in FIG. 10A. A key 1017 is a key used to discard the settings of finishing made via the screens in FIGS. 10A and 10B.

Referring back to FIG. 12, in step S1204, in response to the pressing of keys by the user via the screens in FIGS. 10A and 10B, the CPU 111 receives the settings of a finishing process. For example, if the key 1007 is pressed, the CPU 111 receives the use of the staple binding process. If, on the other hand, the key 1008 is pressed, the CPU 111 receives the use of the stapleless binding process.

If any one of the keys 1011 to 1014 is pressed, the CPU 111 receives the setting of the binding position corresponding to the pressed key. If the key 1011 is pressed, the CPU 111 sets the position where the binding process is to be performed to the upper left end. Further, if the key 1012 is pressed, the CPU 111 sets the lower left end as a binding position. If the key 1013 is pressed, the CPU 111 sets the upper right end as a binding position. If the key 1014 is pressed, the CPU 111 sets the lower right end as a binding position.

In FIG. 10B, the description has been given of an example case where each corner of the sheets is set as the binding position. The binding position, however, is not limited to these positions. Alternatively, for example, two places on the long side or the short side of the sheets may be settable as the binding position. Further, a direction other than an oblique direction may be settable as the binding direction. Further, in the present exemplary embodiment, the description has been given of an example where the keys 1011 to 1014 are pressed to set the binding position. Alternatively, for example, when the information 1010 is pressed via the operation unit 116, the binding position may be set based on the pressed position.

Referring back to FIG. 12, in step S1205, the CPU 111 determines whether the key 1015 is pressed. If the CPU 111 determines that the "OK" key 1015 is pressed (YES in step S1205), the processing proceeds to step S1206. If the CPU 111 determines that the "OK" key 1115 is not pressed (NO in step S1205), the processing proceeds to step S1207. In step S1206, the CPU 111 holds, in the RAM 113, the contents set or selected by the user as setting values of a job, and ends the setting of the finishing process, and the processing returns to step S1201.

On the other hand, in step S1207, the CPU 111 determines whether the key 1017 is pressed. If the CPU 111 determines that the "setting cancellation" key 1017 is pressed (YES in step S1207), the processing proceeds to step S1208. If the CPU 111 determines that the "setting cancellation" key 1017 is not pressed (NO in step S1207), the processing returns to step S1204, in which the CPU 111 receives the settings of the finishing from the user.

In step S1208, the CPU 111 discards the contents set or selected by the user, and ends the setting of the finishing process, and the processing returns to step S1201.

Next, the description will be given of a case where it is determined in step S1202 that the key 901 is not pressed (No in step S1202). If the key 901 is not pressed on the screen in FIG. 9, the processing proceeds to step S1209. In step S1209, the CPU 111 determines whether a start button (not illustrated) is pressed. The start button is provided in the operation unit 116. If the start button is pressed (YES in step S1209), the processing proceeds to step S1210. In step S1210, the CPU 111 executes copying according to setting values of a copy job held in the RAM 113. The execution of copying will be described with reference to a flowchart in FIG. 14. If, on the other hand, the start button is not pressed (NO in step S1209), the processing returns to step S1201.

If the CPU 111 determines in step S1209 that the start button (not illustrated) is pressed on the screen in FIG. 9, the CPU 111 performs a control process based on the flowchart in FIG. 14.

In step S1401, the CPU 111 determines whether the binding process is set for the job. If the binding process is set (YES in step S1401), the processing proceeds to step S1402. If the binding process is not set (NO in step S1401), the processing proceeds to step S1412. In step S1402, the CPU 111 determines whether the stapleless binding process is set for the job. If the stapleless binding process is set (YES in step S1402), the processing proceeds to step S1403. If the stapleless binding process is not set (the staple binding process is set) (NO in step S1402), the processing proceeds to step S1412. If the image processing apparatus includes only the stapleless binding unit 214 as a binding unit for performing the binding process, the process of step S1402 is not performed, and the processing proceeds to step S1403.

In step S1403, the CPU 111 acquires the setting value regarding the printing of the mark when the stapleless binding process is performed, the setting value stored in the storage 114 or the RAM 113. Then, the CPU 111 determines whether a setting is made so that the mark is to be printed in a case where the stapleless binding process is performed. If the setting of the printing of the mark is set to enabled (YES in step S1403), the processing proceeds to step S1404. If the setting of the printing of the mark is set to disabled (NO in step S1403), the processing proceeds to step S1412. The setting value regarding the printing of the mark when the stapleless binding process is performed can be set by the user selecting either the key 1102 or 1103 via the above-described screen 1101 in FIG. 11.

In step S1412, the CPU 111 transmits to the reading unit 118 a control command for reading a sheet. The reading unit 118 reads an image on the sheet and generates image data according to the control command. Then, the reading unit 118 stores the image data into an area (a storage unit) on the storage 114 or the RAM 113 for storing image data.

In step S1413, the CPU 111 determines whether there is a next page. If it is determined that there is a next page (YES in step S1413), the processing returns to step S1412, in which the CPU 111 reads the next page. If, on the other hand, it is determined that there is no next page (NO in step S1413), the processing proceeds to step S1414. In step S1414, the CPU 111 transfers the image data stored in the storage unit to the printing unit 120. The printing unit 120 performs printing based on the image data. If the printing of the read image data is completed, the processing proceeds to step S1415.

In step S1415, the CPU 111 transmits a control command to the sheet processing unit 122. The sheet processing unit 122 performs a finishing process such as a sorting process, a stapleless binding process, or a staple binding process based on the control command, then discharges a sheet bundle to the discharge unit 207, and ends the copy process.

If, on the other hand, it is determined in step S1403 that the mark is to be printed (YES in step S1403), the processing proceeds to step S1404. In step S1404, the CPU 111 reads an image on a sheet, generates image data, and stores the image data into a storage unit. In step S1405, the CPU 111 determines whether the image data generated in step S1404 is image data to be printed on the front surface page of the first sheet. If the generated image data is image data to be printed on the front surface of the first sheet (YES in step S1405), the processing proceeds to step S1406. If the generated image data is not image data to be printed on the front surface of the first sheet (NO in step S1405), the processing proceeds to step S1407.

In step S1406, according to setting information of the binding position set for the job, the CPU 111 determines the position where the mark image is to be added and the orientation of the mark. Then, the CPU 111 combines the mark image with the image data. For example, as a setting of the binding process, if a setting is made so that an oblique binding process is to be performed at the upper left end as illustrated in FIG. 7A as an example, the printing unit 120 combines the mark image with the image data at coordinates (Xc, Yc).

On the other hand, in step S1407, the CPU 111 determines whether there is a next page. If it is determined that there is a next page (YES in step S1407), the processing returns to step S1404, in which the CPU 111 generates image data of the next page. If, on the other hand, it is determined that there is no next page (NO in step S1407), the processing proceeds to step S1408. In step S1408, the CPU 111 determines whether the image data corresponding to the last page is to be printed on the back surface of a sheet. Specifically, if two-sided printing is set for the job and the number of pages is an even number, the CPU 111 determines that the image data corresponding to the last page is to be printed on the back surface of a sheet (YES in step S1408), and the processing proceeds to step S1411. If, on the other hand, one-sided printing is set for the job, or if two-sided printing is set for the job and the number of pages is an odd number, the CPU 111 determines that the image data corresponding to the last page is not to be printed on the back surface of a sheet (NO in step S1408), and the processing proceeds to step S1409.

In step S1409, the CPU 111 determines whether a setting is made so that the mark is to be printed in a case where there is no image to be printed on the back surface of the last sheet. If a setting is made so that the mark is to be printed in a case where there is no image to be printed on the back surface of the last sheet (YES in step S1409), the processing proceeds to step S1410. If, on the other hand, a setting is not made so that the mark is to be printed (NO in step S1409), the processing proceeds to step S1414, in which the CPU 111 performs a print process.

In step S1410, the CPU 111 generates blank image data for a single page. Pixel information of the image data is, for example, filled with a white level (R=255, G=255, B=255).

In step S1411, according to the setting information of the binding position set for the job, the CPU 111 determines the position where the mark image is to be added and the orientation of the mark. Then, the CPU 111 combines the mark image with the image data. For example, as a setting of the binding process, if a setting is made so that an oblique binding process is to be performed at the upper left end as illustrated in FIG. 8A, the CPU 111 combines the mark rotated by 90 degrees with the image data at the position 811b.

In step S1414, the CPU 111 transfers the image data stored in the storage unit to the printing unit 120. The printing unit 120 performs printing based on the image data. If the printing of the read image data is completed, the processing proceeds to step S1415. In step S1415, the printing unit 120 and the sheet processing unit 122 perform a finishing process such as a sorting process or a binding process based on a control command, and end the copy process.

In the present exemplary embodiment, the description has been given of a binding process performed in a case where copying is executed. The present invention, however, is applicable not only to copying but also to printing based on print data received from an external apparatus.

For example, the communication unit I/F 123 receives print data from an external device, and the CPU 111 stores the print data into the storage 114. The CPU 111 controls the printing unit 120 and the sheet processing unit 122 based on the setting values regarding the printing of the mark set via the screen 1101 in FIG. 11 and held in the RAM 113 or the storage 114, and the setting values added to the print data. It is assumed that information about the number of copies to be printed, information about the number of pages of the print data, information about two-sided printing, and information about the binding process are added to the print data.

Based on the information about the binding process added to the print data, the CPU 111 makes each determination in the flowchart illustrated in FIG. 14. Further, in steps S1404 and S1412, the CPU 111 performs the process of generating image data based on the print data.

As described above, according to the first exemplary embodiment, when sheets are bound without using a staple, a mark can be added to the sheets. Further, the user can set in advance whether the mark is to be added. Thus, according to the user's request, it is possible to switch whether the mark is to be added.

In the first exemplary embodiment, the description has been given using an example where, after all image data to be printed is stored in a storage unit, the printing unit 120 starts printing. The present invention, however, is not limited to this. For example, the present invention is also applicable to a case where reading control and printing control are performed in parallel. For example, a first control program may perform reading control in steps S1404 to S1413, and a second control program may perform printing control in step S1414. Then, the first and second control programs may cooperate to perform a copy process. The first control program performs the processes up to the generation of image data in steps S1404 and S1412 and the combining of the mark image with the image data. The second control program monitors a storage unit. If the second control program detects that image data is stored, the second control program prints the stored image data. In this case, the printing of image data and the reading of image data on and after a next page can be performed in parallel. This can shorten the time required for copying.

Figure 15A:
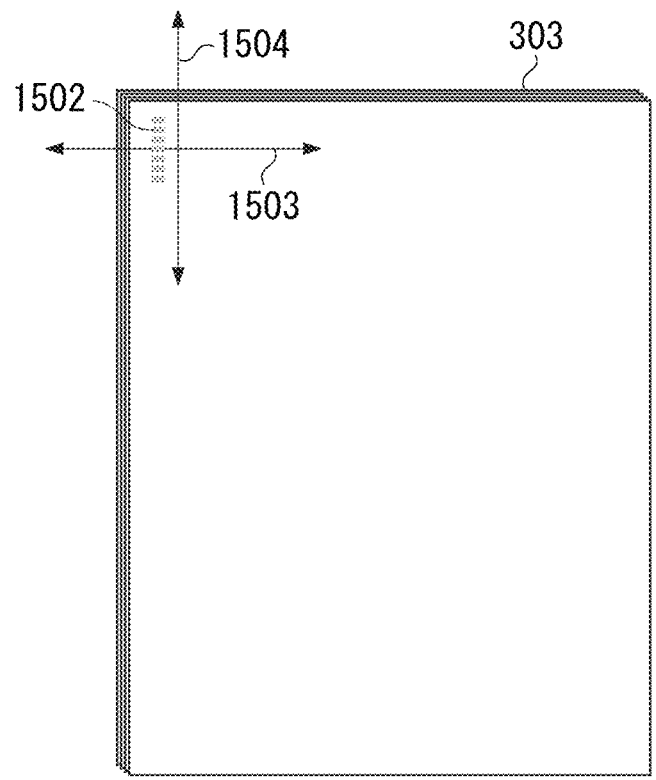
FIGS. 15A and 15B are diagrams illustrating a modified example of a mark to be added to a sheet.
Figure 15B:
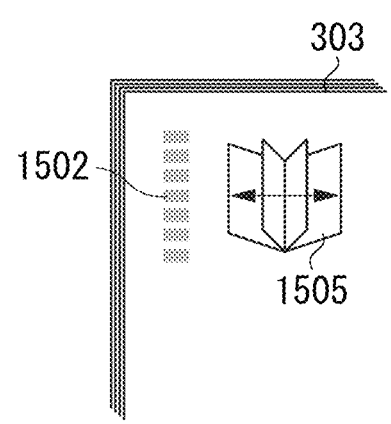

The mark to be added in the present exemplary embodiment may have a design for guiding the direction in which the sheets should be turned over. Thus, in the present exemplary embodiment, a mark as illustrated in FIG. 15B may be added. FIGS. 15A and 15B are diagrams illustrating a modified example of the mark to be added to the sheets. FIG. 15A is a diagram illustrating an example of the binding process using the stapleless binding unit 214. The description will be given of an example case where the binding process is performed parallel to the long side of the sheets 303 at a position at the upper left end of the sheets 303. A binding position 1502 indicates a position where the binding process is performed. Arrows 1503 and 1504 illustrate examples of the directions of external forces applied when the sheets 303 are turned over, and indicate in which directions the sheet bundle should be turned over. The direction of the arrow 1503 indicates the direction in which the binding strength is great.

If the binding process is performed parallel to the end of the sheets 303, even if a force in the direction of the arrow 1503 is applied to the binding position when the viewer turns over the sheets 303, the sheets 303 are unlikely to come off. If, on the other hand, a force in the direction of the arrow 1504 is applied to the binding position when the viewer turns over the sheets 303, the sheets 303 are likely to come off. In this case, the viewer should be led to turn over the sheets 303 not by opening the sheets 303 from top to bottom or bottom to top, but by opening the sheets 303 from left to right or right to left.

In view of this point, in step S1406 or S1411 as described above, the CPU 111 may combine, with the image data, a mark indicating the direction in which the document should be turned over. For example, to lead the viewer to open the sheets 303 from left to right or right to left, a mark 1505 for guiding the direction in which the sheets 303 are turned over from left to right or right to left is printed near the binding position as illustrated in FIG. 15B. The mark 1505 illustrated in FIG. 15B is merely an example of the indication of the opening direction. Alternatively, any mark may be used that can indicate to the viewer the direction in which the sheets 303 should be turned over. Further, both the mark 701 and the mark 1505 may be added to the sheets 303.

Further, in the present exemplary embodiment, the description has been given of an example case where the mark is printed on the front surface page of the first sheet and the back surface of the last sheet. The present invention, however, is not limited to this. The mark to be added in the present exemplary embodiment may be added, for example, not only to the front surface page of the first sheet and the back surface of the last sheet, but also to all the sheets. In this case, for example, the determination of whether the generated image data is image data to be printed on the first page in step S1405 is omitted, and the mark image is combined with all the image data.

Further, in the present exemplary embodiment, the image processing apparatus includes, for example, the CPU 111, the reading unit 118, the printing unit 120, and the sheet processing unit 122. Alternatively, in an exemplary embodiment according to the present invention, a printing control apparatus for controlling the printing unit 120 and the sheet processing unit 122 may include the CPU 111, the ROM 112, the RAM 113, the storage 114, the operation unit 116, and the communication unit I/F 123.

In the first exemplary embodiment, the description has been given of an exemplary embodiment based on an image processing apparatus or a printing control apparatus. Alternatively, the present invention is also applicable to an information processing apparatus for transmitting print data to an image processing apparatus.

Figure 16:
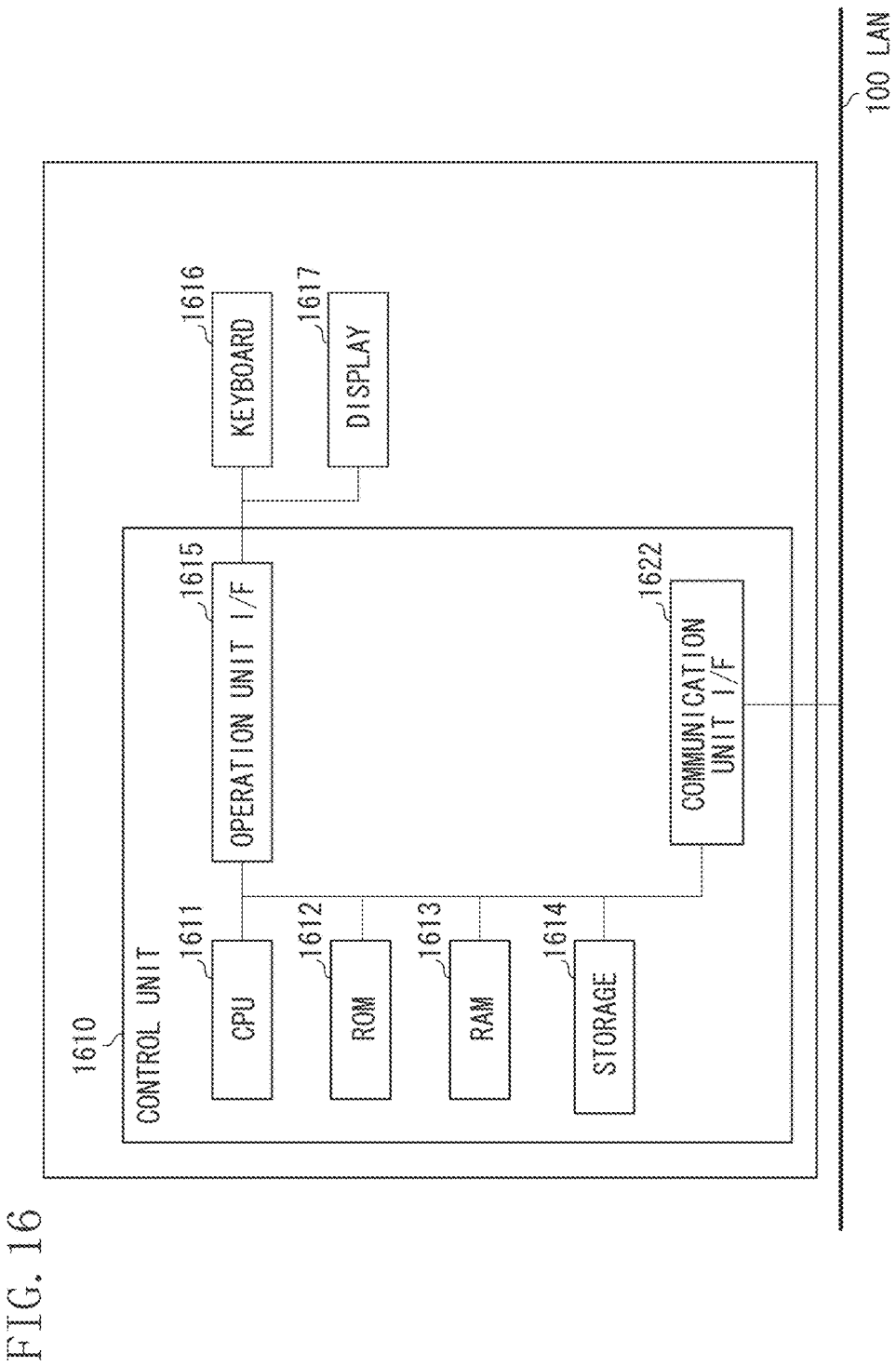
FIG. 16 is a block diagram illustrating a hardware configuration of an information processing apparatus.

FIG. 16 is a block diagram illustrating the hardware configuration of an information processing apparatus according to a second exemplary embodiment. The information processing apparatus has the function of transmitting print data to an image processing apparatus and causing the image processing apparatus to perform printing based on the print data.

A control unit 1610 includes a CPU 1611, and controls the operation of the entire information processing apparatus. The CPU 1611 reads a system program and an application program that are stored in a ROM 1612 or a storage 1614 to perform processing. The ROM 1612 stores a control program that can be executed by the CPU 1611. A RAM 1613 is a main storage memory for the CPU 1611 and is used as a work area or a temporary storage area for loading various programs stored in the storage 1614, and data and a control variable that are used in the various programs. The storage 1614 stores setting values registered by the user, management data of the information processing apparatus, application programs such as a document application and a calculation application, and a driver program for transmitting print data to the image processing apparatus. In the present exemplary embodiment, the storage 1614 is assumed to be an auxiliary storage device such as an HDD. Alternatively, a non-volatile storage device such as a flash disk typified by an SSD may be used instead of the HDD.

In the information processing apparatus according to the present exemplary embodiment, it is assumed that a single CPU 1611 uses a single memory (the RAM 1613) to perform processes illustrated in flowcharts described below. Alternatively, another form may be employed. For example, a plurality of CPUs, RAMs, ROMs, and storages can cooperate to perform the processes illustrated in the flowcharts described below.

An operation unit I/F 1615 connects input and output devices and the control unit 1610. A keyboard 1616 is used to input an instruction from the user, and to input a character and a number. A mouse may be prepared in addition to the keyboard 1616.

A display 1617 is an output device for displaying information to the user. The user inputs an instruction by pressing a key displayed on the display 1617, using an input device such as the keyboard 1616 or the mouse.

Further, the control unit 1610 is connected to a LAN 100 via a communication unit I/F 1622. The communication unit I/F 1622 transmits data to an external apparatus via a network such as the LAN 100 or a wireless LAN (not illustrated), and receives data from an external apparatus on the LAN 100. Further, the communication unit I/F 1622 communicates with an external apparatus via a local interface such as a USB interface.

The control unit 1610 transmits print data to the image processing apparatus and receives image data from the image processing apparatus via the communication unit I/F 1622. In the present exemplary embodiment, as an example of the information processing apparatus, an information processing apparatus including a keyboard and a display is used. Alternatively, for example, a portable information terminal such as a smartphone or a tablet terminal may be used. It is possible to appropriately modify the method for providing a control method for transmitting print data to the image processing apparatus. The control method may be provided as an application for printing. Alternatively, the method is also applicable to a control method for transmitting print data to the image processing apparatus via a cloud server. Yet alternatively, the method is also applicable to a control method for transmitting print data to the image processing apparatus using a communication method such as Bluetooth (registered trademark) or near field communication (NFC).

Figure 17:
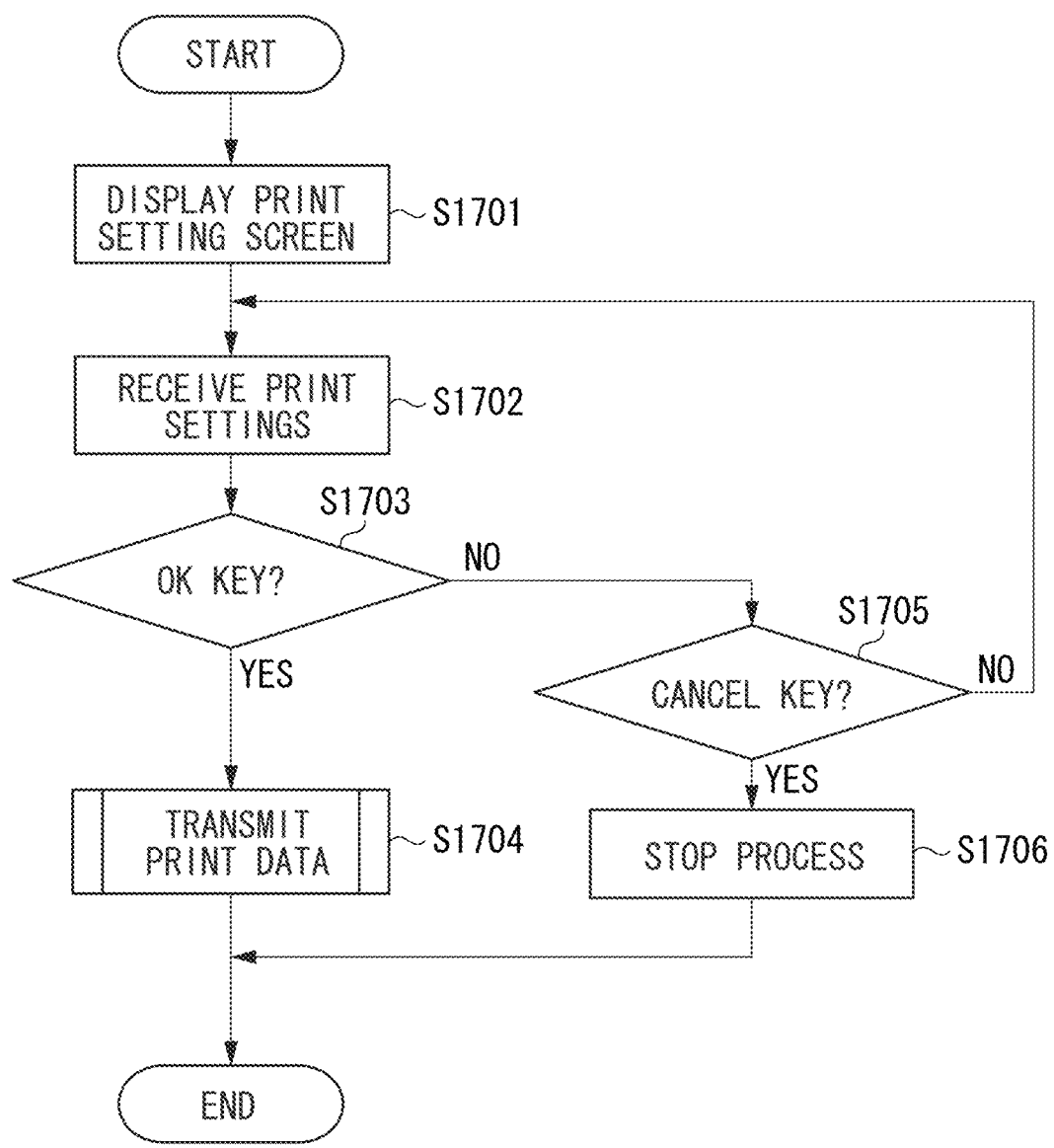
FIG. 17 is a flowchart illustrating a control method for transmitting print data to an image processing apparatus.

FIGS. 17 and 20 are flowcharts illustrating the control method for transmitting print data to the image processing apparatus. In this control method, each operation (step) illustrated in the flowcharts in FIGS. 17 and 20 is achieved by the CPU 1611 executing a driver program based on the flowcharts. If the user issues an instruction for printing data, the CPU 1611 executes the driver program. First, in step S1701, the CPU 1611 displays on the display 1617 an operation screen for setting printing.

Figure 18A:
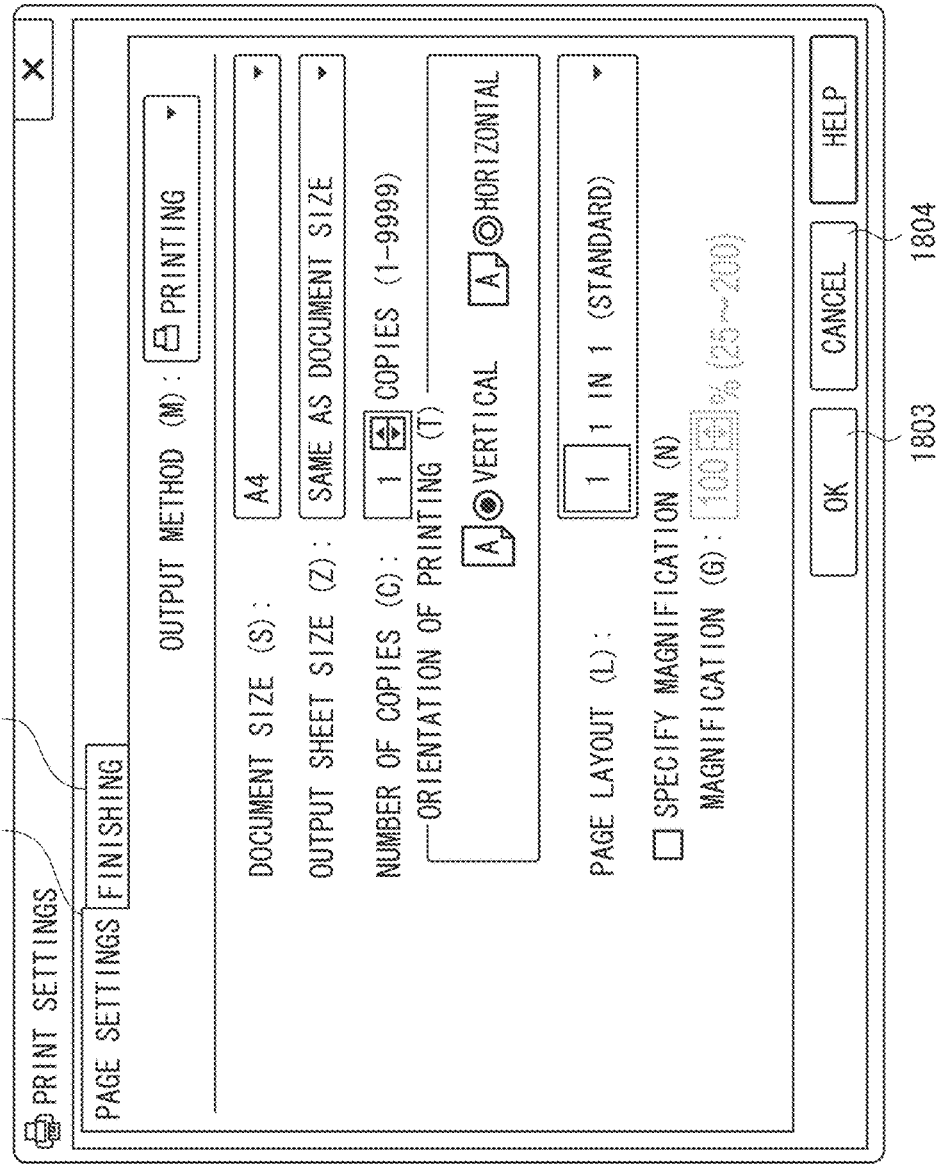
FIGS. 18A and 18B are diagrams illustrating operation screens displayed on a display.

FIG. 18A is a diagram illustrating an example of the setting screen displayed in step S1701. Via the screen in FIG. 18A, the user can set the document size, the sheet size on which printing is performed, the number of copies, the orientation of printing, and the page layout (page aggregate). A tab key 1801 is a key used to display items for making page settings. A tab key 1802 is a key used to display items regarding a finishing process. A key 1803 is a key used by the user to transmit print data to the image processing apparatus. A key 1804 is a key used to cancel the transmission of print data.

Figure 18B:
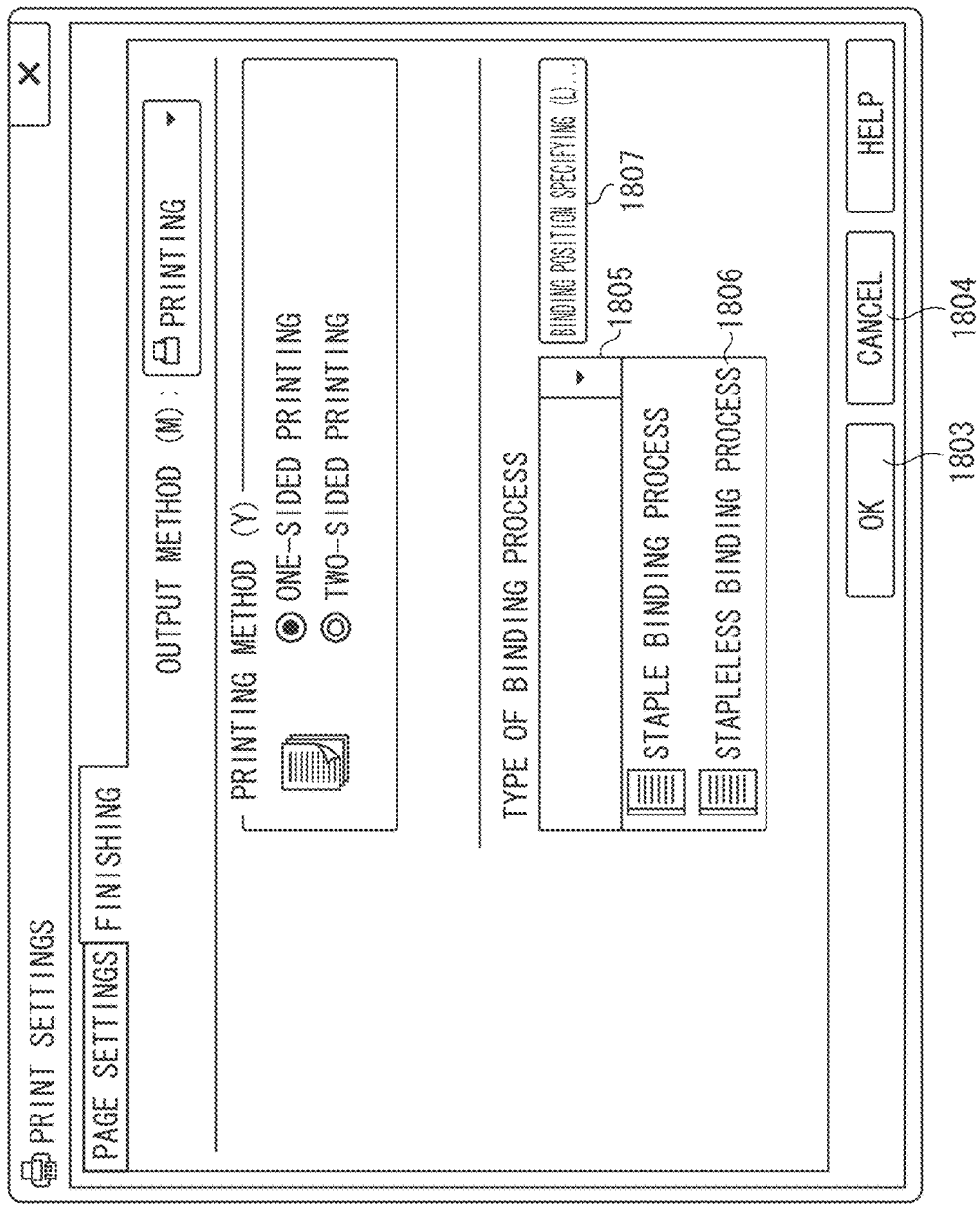

If the tab key 1802 is pressed on the screen in FIG. 18A, the CPU 1611 causes the screen to transition to a screen corresponding to a finishing tab illustrated in FIG. 18B. FIG. 18B is a diagram illustrating an example of an operation screen. On the screen in FIG. 18B, the user can select one-sided printing or two-sided printing, select the type of the binding process, specify the binding position, and set the printing of the mark. The printing of the mark can be set only if the user selects the stapleless binding process as the binding process.

To return from the screen in FIG. 18B to the page setting screen, the user presses the tab key 1801. An area 1805 is an area for selecting the type of the binding process. If the area 1805 is pressed, "stapleless binding process" and "staple binding process" are displayed as options in a drop-down list. In the present exemplary embodiment, the binding process is selected between two types including the staple binding process and the stapleless binding process. The binding process options, however, are not limited to these binding processes. It is only required that a binding process according to a binding unit included in the image processing apparatus to which print data is transmitted can be selected.

If the user selects an item 1806 from the drop-down list, the CPU 1611 controls the screen to display check boxes for making settings regarding the printing of the mark.

Figure 19A:
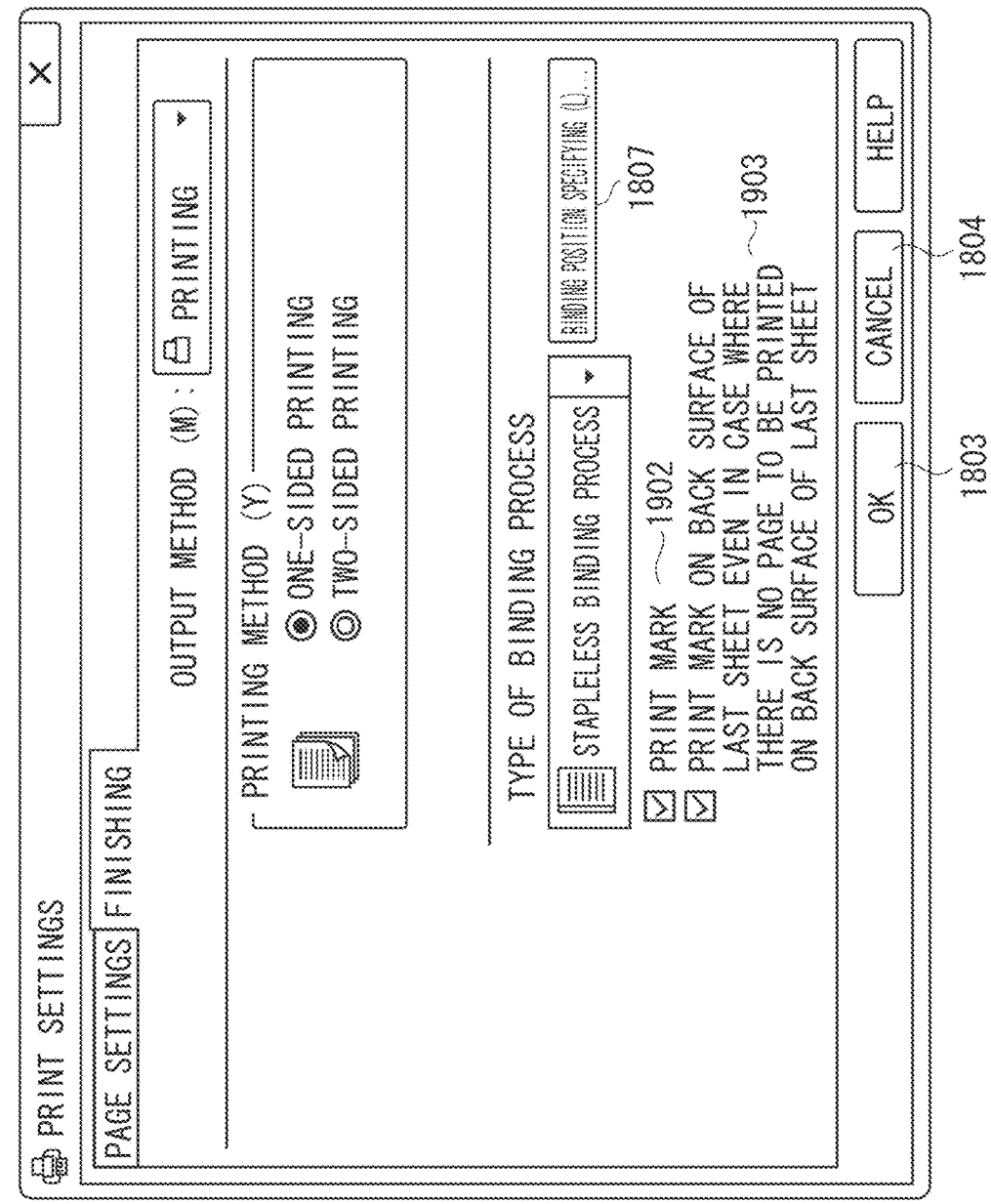

FIG. 19A is a diagram illustrating an example of an operation screen displayed when the stapleless binding process is selected as the binding process. Check boxes 1902 and 1903 in FIG. 19A are examples of setting items regarding the stapleless binding process.

Via the screen in FIG. 19A, the user can set the printing of the mark. The box 1902 is a check box used to change the setting of whether the mark is to be printed. The box 1903 is a check box used to change the setting of whether the mark is to be printed on the back surface of the last sheet even in a case where there is no image to be printed on the back surface of the last sheet. The user can press the box 1902 or 1903 to reverse the state of the check box. The setting is enabled in a state where the box is checked, and the setting is disabled in a state where the box is not checked. The check box 1903 is displayed in a selectable manner only if the setting of the printing of the mark is set to enabled. If the setting of the printing of the mark is not set to enabled, the check box 1903 is displayed in a grayed-out manner.

A key 1807 is a key used to set the binding position. If the user presses the key 1807, the CPU 1611 newly displays a screen in FIG. 19B as a sub screen of the screen in FIG. 19A. The CPU 1611 performs control so that an operation on the screen in FIG. 19A is not received unless the user responds to the screen in FIG. 19B.

FIG. 19B is an example of the operation screen displayed when the key 1807 is pressed. In FIG. 19B, the user can select from among radio buttons 1912 the position where the binding process is to be performed. The radio buttons 1912 are radio buttons for selecting one setting from among a plurality of buttons (options). Further, information 1911 is information for notifying the user of the position where the binding process is to be performed. A key 1913 is a key used to apply the setting regarding the binding process set via the screen in FIG. 19B and close the setting screen. A key 1914 is a key used to discard the setting regarding the binding process set via the screen in FIG. 19B and close the setting screen. If the key 1913 or 1914 is pressed, the CPU 111 closes the screen in FIG. 19B as the sub screen, and resumes the reception of an operation on the screen in FIG. 19A as a main screen. The user can make further settings of printing via the screens in FIGS. 18A, 18B, 19A, and 19B.

Referring back to FIG. 17, in step S1702, via the screens in FIGS. 18A, 18B, 19A, and 19B, the CPU 1611 receives settings regarding print data including the settings of the binding position and the binding process. In step S1703, the CPU 1611 determines whether the key 1803 is pressed via the screen in FIG. 18A, 18B, or 19A. If the CPU 1611 determines that the "OK" key 1803 is pressed (YES in step S1703), the processing proceeds to step S1704. If the CPU 1611 determines that the "OK" key 1803 is not pressed (NO in step S1703), the processing proceeds to step S1705. In step S1704, the CPU 1611 generates print data according to the setting values held in the storage 1614. The process of step S1704 will be described with reference to a flowchart in FIG. 20.

On the other hand, in step S1705, the CPU 1611 determines whether the key 1804 is pressed via the screen in FIG. 18A, 18B, or 19A. If the CPU 1611 determines that the "cancel" key 1804 is pressed (YES in step S1705), the processing proceeds to step S1706. If the CPU 1611 determines that the "cancel" key 1804 is not pressed (NO in step S1705), the processing returns to step S1702, in which the CPU 1611 receives print settings from the user. In step S1706, the CPU 1611 stops the transmission of print data, and also closes the print setting screen.

Next, the transmission of print data will be described with reference to FIG. 20. In the present exemplary embodiment, control for generating print data including image data combined with the mark and transmitting the generated print data is performed.

In step S2001, the CPU 1611 determines whether, in the setting values held in the storage 1614, a setting is made so that the mark is to be printed. If a setting is made so that the mark is to be printed (YES in step S2001), the processing proceeds to step S2002. If a setting is not made so that the mark is to be printed (NO in step S2001), the processing proceeds to step S2011.

In step S2011, the CPU 1611 generates output data for a single page from the data that the user has issued the instruction to print. Then, the CPU 1611 temporarily stores the output data onto the storage 1614 or the RAM 1613. In step S2012, the CPU 1611 determines whether there is a next page. If it is determined that there is a next page (YES in step S2012), the processing returns to step S2011, in which the CPU 1611 reads the next page. If, on the other hand, it is determined that there is no next page (NO in step S2012), the processing proceeds to step S2010.

If, on the other hand, it is determined in step S2001 that the mark is to be printed (YES in step S2001), the processing proceeds to step S2002. In step S2002, the CPU 1611 generates output data for a single page from the data that the user has issued the instruction to print. Then, the CPU 1611 temporarily stores the output data onto the storage 1614 or the RAM 1613.

In step S2003, the CPU 1611 determines whether the output data generated in step S2002 is output data corresponding to the first page. If the generated output data corresponds to image data of the first page (YES in step S2003), the processing proceeds to step S2004. If the generated output data does not correspond to image data of the first page (NO in step S2003), the processing proceeds to step S2005.

In step S2004, according to the setting value of the binding position held in the storage 1614, the CPU 1611 determines the position where the mark image is to be added and the orientation of the mark. Then, the CPU 1611 combines the mark image with the output data corresponding to the first page.

On the other hand, in step S2005, the CPU 1611 determines whether there is a next page. If it is determined that there is a next page (YES in step S2005), the processing returns to step S2002, in which the CPU 1611 generates image data of the next page. If, on the other hand, it is determined that there is no next page (NO in step S2005), the processing proceeds to step S2006. In step S2006, the CPU 1611 determines whether the output data corresponding to the last page is to be printed on the back surface of a sheet. Specifically, if two-sided printing is set in the print settings made via the screens in FIGS. 18A, 18B, 19A, and 19B, and the number of pages is an even number, the CPU 1611 determines that the output data corresponding to the last page is to be printed on the back surface of a sheet (YES in step S2006), and the processing proceeds to step S2009. If, on the other hand, one-sided printing is set, or if two-sided printing is set and the number of pages is an odd number, the CPU 1611 determines that the output data corresponding to the last page is not to be printed on the back surface of a sheet (NO in step S2006), and the processing proceeds to step S2007.

In step S2007, the CPU 1611 determines whether a setting is made so that the mark is to be printed in a case where there is no image to be printed on the back surface of the last sheet. If a setting is made so that the mark is to be printed in a case where there is no image to be printed on the back surface of the last sheet (YES in step S2007), the processing proceeds to step S2008. If, on the other hand, a setting is not made so that the mark is to be printed in a case where there is no image to be printed on the back surface of the last sheet (NO in step S2007), the processing proceeds to step S2010. In step S2010, the CPU 1611 performs a print process.

In step S2008, the CPU 1611 generates blank output data to be printed on the back surface of the last sheet. In step S2009, according to the setting value of the binding position held in the storage 1614, the CPU 1611 determines the position where the mark image is to be added and the orientation of the mark. Then, the CPU 1611 combines the mark image with the output data corresponding to the last page. For example, as a setting of the binding process, if a setting is made so that an oblique binding process is to be performed at the upper left end as illustrated in FIG. 7A, the CPU 1611 combines the mark rotated by 90 degrees with the output data at the position 811*b* illustrated in FIG. 8B.

In step S2010, the CPU 1611 generates print data based on the setting values and the output data held in the storage 1614. Further, the CPU 1611 controls the communication unit I/F 1622 to transmit the print data to the image processing apparatus, and transmits the print data. Then, the transmission process ends. For example, the output data, information about the number of copies to be printed, information about the number of pages of the print data, information about two-sided printing, and information about the binding process are added to the print data generated by the CPU 1611 in step S2010.

The image processing apparatus performs a print process based on the received print data as described in the first exemplary embodiment. The CPU 111 of the image processing apparatus conveys a sheet from a sheet feeding unit specified in the print data, prints an image based on the print data on the conveyed sheet, and performs a binding process specified in the print data.

In the present exemplary embodiment, also in a case in which an information processing apparatus transmits print data to an image processing apparatus and the image processing apparatus performs a binding process based on the print data, it is possible to add to sheets a mark that allows the identification of the binding position when the sheets are bound without using a staple.

In the present exemplary embodiment, the description has been given of an example case where, when generating output data of print data, the driver program combines the mark with the output data in advance. The present invention, however, is not limited to this. Alternatively, for example, the driver program may add setting information about the mark to print data, and the image processing apparatus may add the mark.

Further, in the present exemplary embodiment, the description has been given of an example case where the mark is printed on the front surface page of the first sheet and the back surface of the last sheet. The present invention, however, is not limited to this. Alternatively, for example, the mark image may be combined with output data of all the pages for which the binding process is set.

While the desirable exemplary embodiments of the present invention have been described above in detail, the present invention is not limited to such particular exemplary embodiments, but can be modified and changed in various manners within the scope of the present invention described in the appended claims.

According to an exemplary embodiment of the present invention, if a binding process without using a staple is performed, the position where the binding process is performed is made easily identifiable. This can prevent sheets from being torn or coming off.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178562, filed Sep. 2, 2014, which is hereby incorporated by reference herein in its entirety.

What is claimed is:

1. An image processing apparatus comprising:
a printing unit configured to print an image on a sheet;
a stapleless binding unit configured to perform a stapleless binding process for binding, without using a staple, a plurality of sheets on which images are printed by the printing unit;
a combining unit configured to combine, with a print target image, a mark image to be printed on at least one of the plurality of sheets indicating a position proximate thereto, yet separate therefrom, where the stapleless binding process is to be performed, the mark image identifiably showing that the plurality of sheets has been bound; and
a control unit configured to, in a case where the stapleless binding unit performs the stapleless binding process, perform control so that an image with which the mark image is combined by the combining unit is printed on a sheet.

2. The image processing apparatus according to claim 1, wherein the combining unit combines the mark image with an image corresponding to a front surface of a first sheet of the plurality of sheets to be subjected to the stapleless binding process.

3. The image processing apparatus according to dam 2, wherein the combining unit further combines the mark image with an image corresponding to a back surface of a last sheet of the plurality of sheets to be subjected to the stapleless binding process.

4. The image processing apparatus according to claim 1, further comprising a binding setting unit configured to set a binding position where the stapleless binding unit performs the stapleless binding process, wherein based on the binding position set by the binding setting unit, the combining unit determines a position where the mark image is combined.

5. The image processing apparatus according to claim 1, wherein the combining unit combines the mark image within an area where the printing unit can perform printing.

6. The image processing apparatus according to claim 1, further comprising a first setting unit configured to set whether a mark is to be printed, wherein even in a case where the stapleless binding unit performs the stapleless binding process, the combining unit does not combine the mark image if the first setting unit makes a setting so that the mark is not to be printed.

7. The image processing apparatus according to claim 1, further comprising a second setting unit configured to, in a case where there is no print target image corresponding to a back surface of a last sheet of the plurality of sheets to be subjected to the stapleless binding process, set whether a mark is to be printed on the back surface of the last sheet.

8. The image processing apparatus according to claim 1, wherein the combining unit combines, with the print target image, a mark image indicating a direction in which a sheet is to be turned over.

9. An image processing apparatus comprising:
a printing unit configured to print an image on a sheet;
a stapleless binding unit configured to perform a stapleless binding process for binding, without using a staple, a plurality of sheets on which images are printed by the printing unit;
an imprinting unit configured to imprint, on at least one of the plurality of sheets, a stamp indicating a position proximate thereto, yet separate therefrom, where the stapleless binding process is to be performed or has been performed, the stamp identifiably showing that the plurality of sheets has been bound; and
a control unit configured to, in a case where the stapleless binding unit performs the stapleless binding process, control the imprinting unit to imprint the stamp.

10. A method for controlling an image processing apparatus including a printing unit configured to print an image on a sheet, and a stapleless binding unit configured to perform a stapleless binding process for binding, without using a staple, a plurality of sheets on which images are printed by the printing unit, the method comprising:
combining, with a print target image, a mark image to be printed on at least one of the plurality of sheets indicating a position proximate thereto, yet separate therefrom, where the stapleless binding process is to be performed, the mark image identifiably showng that the plurality of sheets has been bound; and
in a case where the stapleless binding unit performs the stapleless binding process, performing control so that an image with which the mark image is combined in the combining is printed on a sheet.

11. A method for controlling an image processing apparatus including a printing unit configured to print an image on a sheet, a stapleless binding unit configured to perform a stapleless binding process for binding, without using a staple, a plurality of sheets on which images are printed by the printing unit, and an imprinting unit configured to imprint, on at least one of the plurality of sheets, a stamp indicating a position proximate thereto, yet separate therefrom, where the stapleless binding process is to be performed or has been performed, the method comprising:
in a case where the stapleless binding unit performs the stapleless binding process, controlling the imprinting unit to imprint the stamp.

12. An information processing apparatus for transmitting a print target image to an image processing apparatus including a printing unit configured to print an image on a sheet, and a stapleless binding unit configured to perform a stapleless binding process for binding, without using a staple, a plurality of sheets on which images are printed by the printing unit, the information processing apparatus comprising:
a setting unit configured to set whether the stapleless binding process is to be performed;
a combining unit configured to combine, with the print target image, a mark image to be printed on at least one of the plurality of sheets indicating a position proximate thereto, yet separate therefrom, where the stapleless binding process is to be performed, the mark image identifiably showing that the plurality of sheets has been bound; and
a transmission unit configured to, in a case where the setting unit makes a setting so that the stapleless binding process is to be performed, transmit to the image processing apparatus an image with which the mark image is combined by the combining unit.

13. A method for controlling an information processing apparatus for transmitting a print target image to an image processing apparatus including a printing unit configured to print an image on a sheet, and a stapleless binding unit configured to perform a stapleless binding process for binding, without using a staple, a plurality of sheets on which images are printed by the printing unit, the method comprising:

setting whether the stapleless binding process is to be performed;

combining, with the print target image, a mark image to be printed on at least one of the plurality of sheets indicating a position proximate thereto, yet separate therefrom, where the stapleless binding process is to be performed, the mark image identifiably showing that the plurality of sheets has been bound; and in a case where a setting is made in the setting so that the stapleless binding process is to be performed, transmitting to the image processing apparatus an image with which the mark image is combined in the combining.

* * * * *